United States Patent
Goldfarbmuren

(10) Patent No.: US 11,079,184 B2
(45) Date of Patent: Aug. 3, 2021

(54) METHODS, SYSTEMS, AND DEVICES FOR THERMAL ENHANCEMENT

(71) Applicant: Rebound Technologies, Inc., Denver, CO (US)

(72) Inventor: Russell Goldfarbmuren, Denver, CO (US)

(73) Assignee: Rebound Technologies, Inc., Commerce City, CO (US)

( * ) Notice: Subject to any disclaimer, the term of this patent is extended or adjusted under 35 U.S.C. 154(b) by 0 days.

(21) Appl. No.: 15/855,048

(22) Filed: Dec. 27, 2017

(65) Prior Publication Data

US 2018/0252477 A1    Sep. 6, 2018

Related U.S. Application Data

(63) Continuation of application No. 15/090,756, filed on Apr. 5, 2016, now Pat. No. 9,885,524, which is a
(Continued)

(51) Int. Cl.
*F28D 20/02* (2006.01)
*F28D 19/00* (2006.01)
(Continued)

(52) U.S. Cl.
CPC .............. *F28D 20/02* (2013.01); *F01D 15/10* (2013.01); *F01K 3/00* (2013.01); *F01K 11/02* (2013.01);
(Continued)

(58) Field of Classification Search
CPC .............. F25C 2600/02; F25C 2600/04; F25C 2700/12; F25C 2700/14; F25C 2305/022; F25C 1/20; H01M 8/04253; F01K 25/085
See application file for complete search history.

(56) References Cited

U.S. PATENT DOCUMENTS

| 952,040 A | 3/1910 | Hall |
| 2,089,886 A | 8/1937 | Friedrich |

(Continued)

FOREIGN PATENT DOCUMENTS

| JP | H-1252838 | 10/1989 |
| JP | H11-108298 | 4/1999 |

(Continued)

OTHER PUBLICATIONS

Nicholls, J., Thermal Approach to Grid Energy Storage, Oregon Future Energy Conference, Apr. 26, 2012, available at http://ns2.thesegurogroup.com/event/images/stories/PDFs/4b_nicholls.pdf.

(Continued)

*Primary Examiner* — Jianying C Atkisson
*Assistant Examiner* — Meraj A Shaikh
(74) *Attorney, Agent, or Firm* — Wilson Patent Law, LLC

(57) ABSTRACT

Methods, systems, and devices are provided for thermal enhancement. Thermal enhancement may include absorbing heat from one or more devices. In some cases, this may improve the efficiency of the one or more devices. In general, a phase transition may be induced in a storage material. The storage material may be combined with a freeze point suppressant in order to reduce its melt point. The mixture may be used to boost the performance of device, such as an electrical generator, a heat engine, a refrigerator, and/or a freezer. The freeze point suppressant and storage material may be separated. By delaying the periods between each stage by prescribed amounts, the methods, systems, and devices may be able to shift the availability of electricity to the user and/or otherwise boost a device at different times in some cases.

18 Claims, 27 Drawing Sheets

Related U.S. Application Data continuation of application No. 13/761,463, filed on Feb. 7, 2013, now Pat. No. 9,310,140.

(60) Provisional application No. 61/596,040, filed on Feb. 7, 2012, provisional application No. 61/716,848, filed on Oct. 22, 2012.

(51) Int. Cl.

| | |
|---|---|
| *F24S 90/00* | (2018.01) |
| *F03G 6/00* | (2006.01) |
| *F01K 25/10* | (2006.01) |
| *H01M 8/04029* | (2016.01) |
| *F01K 3/00* | (2006.01) |
| *H02S 40/38* | (2014.01) |
| *F01D 15/10* | (2006.01) |
| *F01K 11/02* | (2006.01) |

(52) U.S. Cl.
CPC ............ *F01K 25/10* (2013.01); *F01K 25/106* (2013.01); *F03G 6/001* (2013.01); *F24S 90/00* (2018.05); *F28D 19/00* (2013.01); *H01M 8/04029* (2013.01); *H02S 40/38* (2014.12); *F05D 2220/31* (2013.01); *Y02E 10/46* (2013.01); *Y02E 60/14* (2013.01)

(56) References Cited

U.S. PATENT DOCUMENTS

| | | | |
|---|---|---|---|
| 2,590,269 A | 3/1952 | Pike | |
| 2,715,945 A | 8/1955 | Hankison | |
| 3,146,606 A | 9/1964 | Grimes | |
| 3,247,678 A * | 4/1966 | Mohlman | F24F 5/0017 62/199 |
| 3,257,818 A | 6/1966 | Papanu | |
| 3,398,543 A | 8/1968 | Leroy | |
| 3,747,333 A | 7/1973 | Gertsmann | |
| 3,879,956 A | 4/1975 | Ganiaris | |
| 4,471,630 A | 9/1984 | Sugimoto | |
| 4,539,076 A * | 9/1985 | Swain | B01D 1/2856 202/154 |
| 4,584,843 A | 4/1986 | Pronger | |
| 4,809,513 A | 3/1989 | Goldstein | |
| 4,822,391 A | 4/1989 | Rockenfeller | |
| 4,907,415 A | 3/1990 | Stewart | |
| 5,055,185 A | 10/1991 | McMurphy | |
| 5,207,075 A | 5/1993 | Gundlach | |
| 5,255,526 A | 10/1993 | Fischer | |
| 5,632,148 A | 5/1997 | Bronicki | |
| 5,678,626 A * | 10/1997 | Gilles | F24F 5/0017 165/62 |
| 5,941,089 A | 8/1999 | Takaishi | |
| 6,012,298 A | 1/2000 | Goldstein | |
| 6,038,876 A | 3/2000 | Lang | |
| 6,253,116 B1 | 6/2001 | Zhang | |
| 9,310,140 B2 | 4/2016 | Muren | |
| 9,360,242 B2 | 6/2016 | Muren | |
| 9,885,524 B2 | 2/2018 | Muren | |
| 10,584,904 B2 | 3/2020 | Goldfarbmuren | |
| 2003/0066906 A1 | 4/2003 | Krause | |
| 2005/0095476 A1 | 5/2005 | Schrooten | |
| 2006/0141331 A1 | 6/2006 | Reiser | |
| 2007/0062853 A1 | 3/2007 | Spani | |
| 2007/0134526 A1 | 6/2007 | Numao | |
| 2007/0137223 A1 | 6/2007 | Brekke | |
| 2008/0142166 A1 | 6/2008 | Carson | |
| 2009/0019861 A1 | 1/2009 | Heckt | |
| 2009/0044935 A1 * | 2/2009 | Nutsos | C09K 5/20 165/301 |
| 2009/0293507 A1 | 12/2009 | Narayanamurthy | |
| 2009/0312851 A1 | 12/2009 | Mishra | |
| 2010/0145114 A1 | 6/2010 | Abhari | |
| 2010/0206812 A1 * | 8/2010 | Woods | C10G 21/00 210/656 |
| 2010/0218542 A1 | 9/2010 | McCollough | |
| 2010/0218917 A1 | 9/2010 | Barnwell | |
| 2010/0281907 A1 | 11/2010 | Giertz | |
| 2010/0310954 A1 | 12/2010 | Odgaard | |
| 2011/0023505 A1 | 2/2011 | Popov | |
| 2012/0103005 A1 | 5/2012 | Kopko | |
| 2012/0193067 A1 | 8/2012 | Miller | |
| 2013/0199753 A1 | 8/2013 | Muren | |
| 2013/0227983 A1 | 9/2013 | Jeong | |
| 2013/0327407 A1 | 12/2013 | Hermann | |
| 2014/0102662 A1 | 4/2014 | Grama | |
| 2014/0102672 A1 | 4/2014 | Campbell | |
| 2015/0114019 A1 | 4/2015 | Van Gysel | |
| 2016/0187065 A1 | 6/2016 | Muren | |
| 2016/0290735 A1 | 10/2016 | Muren | |
| 2018/0283745 A1 | 10/2018 | Goldfarbmuren | |
| 2019/0137158 A1 | 5/2019 | Goldfarbmuren | |
| 2020/0318867 A1 | 10/2020 | Goldfarbmuren | |

FOREIGN PATENT DOCUMENTS

| | | |
|---|---|---|
| WO | WO2009070728 | 6/2009 |
| WO | WO 2011162669 | 12/2011 |
| WO | WO2012036166 | 3/2012 |
| WO | WO2014100330 | 6/2014 |
| WO | WO2014111012 | 7/2014 |
| WO | WO2014191230 | 12/2014 |
| WO | WO2016049612 | 3/2016 |
| WO | WO2017165378 | 9/2017 |
| WO | WO2018183238 | 10/2018 |
| WO | WO2019165328 | 8/2019 |
| WO | WO2020132467 | 6/2020 |

OTHER PUBLICATIONS

Nishimura, S., Ultra Eco-Ice System, Feb. 3, 2014, available at http://www.atmo.org/media.presentation.php?id=371.

Non-Final Office Action, U.S. Appl. No. 13/761,463, dated Aug. 20, 2015, USPTO.

Notice of Allowance, U.S. Appl. No. 13/761,463, dated Jan. 13, 2016, USPTO.

Notice of Allowance, U.S. Appl. No. 15/090,756, dated Aug. 27, 2017, USPTO.

Notice of Allowance, U.S. Appl. No. 14,280,080, dated Mar. 28, 2016, USPTO.

Non-Final Office Action, U.S. Appl. No. 14865,727, dated Dec. 1, 2017, USPTO.

Final Office Action, U.S. Appl. No. 14/865,727, dated Aug. 6, 2018, USPTO.

Advisory Action, U.S. Appl. No. 14/865,727, dated Oct. 24, 2018, USPTO.

Non-Final Office Action, U.S. Appl. No. 14/865,727, dated Mar. 3, 2019, USPTO.

Extended European Search Report and Search Opinion, European Appl. No. 15844161.8, dated Apr. 26, 2018, EPO.

First Examination Report, European Appl. No. 15844161.8, dated Mar. 13, 2019, EPO.

International Search Report and Written Opinion, PCT/US2015/052521, dated Dec. 14, 2015, ISA-USPTO.

International Search Report and Written Opinion, PCT/US17/23356, dated Jun. 16, 2017, ISA-USPTO.

International Search Report and Written Opinion, PCT/US18/24436, dated Mar. 27, 2018, ISA-USPTO.

International Search Report and Written Opinion, PCT/2019/019323, dated Apri 26, 2019, ISA-USPTO.

Final Office Action, U.S. Appl. No. 14/865,727, dated Dec. 23, 2019, USPTO.

Office Action, Japanese Appl. No. JP 2016-576018, JPO, dated Jul. 29, 2019.

Intention to Grant, European Appl. No. 15844161.8, European Patent Office, dated Sep. 30, 2019.

Notice of Allowance, U.S. Appl. No. 15/935,005, USPTO, dated Oct. 8, 2019.

(56) References Cited

OTHER PUBLICATIONS

Restriction Requirement, U.S. Appl. No. 15/935,005, dated Jun. 20, 2019, USPTO.
Notice of Allowance, U.S. Appl. No. 16/813,023, dated Oct. 27, 2020, USPTO.
Office Action, Chinese Appl. No. 201880035102.3, dated Jul. 16, 2020, CNIPA.
Extended European Search Report and Search Opinion, European Appl. No. 18777347.8, dated Nov. 18, 2020, EPO.
Restriction Requirement, U.S. Appl. No. 14/865,727, dated Jul. 27, 2017, USPTO.
Notice of Panel Decision from Pre-Appeal Brief Review, U.S. Appl. No. 14/865,727, dated Nov. 6, 2020, USPTO.
Notice of Allowance, U.S. Appl. No. 14/865,727, dated Nov. 13, 2020, USPTO.
Decision to Grant a Patent, Japanese Appl. No. JP 2016-576018, dated Jun. 30, 2020, JPO.
Non-Final Office Action, U.S. Appl. No. 16/136,452, dated Apr. 22, 2020, USPTO.
Final Office Action, U.S. Appl. No. 16/136,452, dated Dec. 21, 2020, USPTO.
Extended European Search Report and Search Opinion, European Appl. No. 17770960.7, dated Oct. 30, 2019, EPO.
Rebound Technologies, "Lab notebook: icepoint™ is ready to keep your ice cream cold," Jan. 20, 2015, ttps://www.rebound-tech.com/lab-notebook-icepoint-is-ready-to-keep-your-ice-cream-cold/ (last visited Jan. 26, 2021).
Notice of Allowance, Chinese Appl. No. 201880035102.3, dated Feb. 2, 2021, CNIPA.
Notice of Allowance, U.S. Appl. No. 14/865,727, dated Feb. 23, 2021, USPTO.
International Search Report and Written Opinion, Int'l Appl. No. PCT/US2019/067892, dated Feb. 20, 2020, USPTO-ISA.

\* cited by examiner

METHODS, SYSTEMS, AND DEVICES FOR THERMAL ENHANCEMENT

RELATED APPLICATIONS

The present Application for Patent claims priority to Provisional Application No. 61/596,040 entitled "THERMALLY BOUND RENEWABLE GENERATOR" filed Feb. 7, 2012, and assigned to the assignee hereof and hereby expressly incorporated by reference herein for all purposes. The present Application for Patent also claims priority to Provisional Application No. 61/716,848 entitled "METHODS, SYSTEMS, AND DEVICES FOR SHIFTING ELECTRICAL AVAILABILITY" filed Oct. 22, 2012, and assigned to the assignee hereof and hereby expressly incorporated by reference herein for all purposes. The present Application for Patent also claims priority as a continuation application to U.S. application Ser. No. 13/761,463 entitled "METHODS, SYSTEMS, AND DEVICES FOR THERMAL ENHANCEMENT," filed Feb. 7, 2013, now U.S. Pat. No. 9,310,140, issued Apr. 12, 2016, and assigned to the assignee hereof and hereby expressly incorporated by reference herein for all purposes. The present Application for Patent also claims priority as a continuation application to U.S. application Ser. No. 15/090,756 entitled "METHODS, SYSTEMS, AND DEVICES FOR THERMAL ENHANCEMENT," filed Apr. 5, 2016, now U.S. Pat. No. 9,885,524, issued Feb. 6, 2018, and assigned to the assignee hereof and hereby expressly incorporated by reference herein for all purposes.

BACKGROUND

The electrical storage field is generally populated by technologies that store electrical energy. The renewable generator technical field is generally populated by technologies that convert a renewable resource into electrical energy.

In the electrical storage area, the energy can come from grid tied or non-grid tied sources and can be stored for very short or long periods of time. These technologies may be considered "batteries" in the sense that they are charged with some amount of energy and then discharge, at the most, the same amount of energy. Although these technologies may be considered batteries, there is a wide array of energy storage technologies that use different storage mediums including chemical, kinetic, potential, and thermal.

In the renewable energy generation field, the technologies utilize a wide variety of renewable energy sources including, wind, solar, biomass, tidal, wave, and geothermal, for example. These technologies may vary in their dispatchability, the amount of internal control they have over their electrical output, but more or less may be considered a direct renewable source to electrical energy converters. That is, they may take a set amount of energy from a renewable source and convert it to electricity at some efficiency less then 100%.

While some technologies may have the ability to store some of their energy locally and dispatch it to the grid when necessary, they may only generate electricity proportionately to their renewable resource. There may also be a general need to boost the performance of difference devices. There may be a need for technologies that overlap of these two fields.

SUMMARY

Methods, systems, and devices are provided for thermal enhancement. Thermal enhancement may include absorbing heat from one or more devices. In some cases, this may improve the efficiency of the one or more devices. In general, a phase transition may be induced in a storage material. The storage material may be combined with a freeze point suppressant in order to reduce its melt point. The mixture may be used to boost the performance of a device, such as an electrical generator, a heat engine, a refrigerator, and/or freezer. In some cases, the mixture may be utilized to cool a freezer, for example. The freeze point suppressant and storage material may be separated.

Some embodiments may be configured to provide a delay period between each stage by prescribed amounts. As a result, methods, systems, and devices may be able to shift the availability of electricity to the user and/or otherwise boost a thermodynamic system and/or device in some cases.

Some embodiments include a system to perform both the conversion of solar energy into electricity and the storage of electricity via thermal mean. Some embodiments use the storage of electricity to enhance the conversion efficiency of solar energy into electricity. Some embodiments utilize direct or indirect thermal energy storage via a solid, gas, liquid, and/or phase change storage material. Some embodiments may utilize a freeze point suppressant—storage material mixture to cool a refrigerator and/or freezer.

Some embodiments include a method for thermal enhancement. The method may include inducing a phase transition in a storage material. This may include partially or fully freezing the storage material, for example. A freeze point suppressant may be combined with the phase-transitioned storage material. One or more devices may be boosted utilizing the combined freeze point suppressant and storage material. This may also be referred to as the combined freeze point suppressant and phase-transitioned storage material. The combined freeze point suppressant and storage material may be separated.

This method may be repeated in some cases after the separation, where the storage material that has been separated from the freeze point suppressant. For example, a phase transition may be induced in the storage material again after separating the combined freeze point suppressant and storage material. The freeze point suppressant may be combined again with the phase-transitioned storage material. The one or more devices may be boosted utilizing the recombined freeze point suppressant and storage material. The recombined freeze point suppressant and storage material may be separated after boosting the one or more devices.

In some configurations, inducing the phase transition in the storage material includes freezing the storage material. The one or more devices may include a refrigeration and/or freezer device. Boosting the refrigeration device and/or freezer device may include reducing the temperature of the refrigeration device and/or freezer device utilizing the combined freeze point suppressant and storage material.

In some configurations, the one or more devices may include an electrical generator. The electrical generator may include at least a heat engine based electrical generator, a fuel cell based electrical generator, and/or a photovoltaic based electrical generator. In some cases, the one or more devices may include a heat engine.

Some embodiments of the method may utilize a variety of storage materials including, but not limited to, water. The storage material may include at least an inorganic liquid or an organic liquid. The method may utilize a variety of freeze point suppressants including, but not limited to, an ionic material. The freeze point suppressant may include at least an inorganic material or an organic material.

The method may utilize a variety of techniques for separating the storage material and freeze point suppressant including, but not limited to, utilizing a membrane process to separate the storage material and freeze point suppressant. In some embodiments, separating the storage material and freeze point suppressant utilizes a distillation to separate the storage material and the freeze point suppressant. Separating the storage material and freeze point suppressant may utilize a membrane process to separate the storage material and freeze point suppressant. Separating the storage material and freeze point suppressant may utilize a photosensitive process to separate the storage material and freeze point suppressant. Separating the storage material and freeze point suppressant may utilize a liquid-liquid extraction process to separate the storage material and freeze point suppressant. Separating the storage material and freeze point suppressant may utilize a chemically induced solubility change extraction process to separate the storage material and freeze point suppressant.

Some embodiments include a thermal enhancement system. The system may include a storage tank that may store a storage material (SM). The system may include a combiner that combines the storage material that has undergone a phase transition with a freeze point suppressant (FPS). A thermal couple that puts the combined storage material and freeze point suppressant in thermal contact with a device may be included. The system may also include a separator that separates the combined storage material and freeze point suppressant. These components of the system may be coupled with each other in different ways such that the storage material, freeze suppressant material, and/or a mixture of storage material and freeze point suppressant may be moved between different components.

In some embodiments, the storage tank and/or combiner may be coupled with a chiller to facilitate inducing the phase transition in transition in the storage material. In some cases, the storage tank and/or the combiner may be coupled with the device to induce the phase transition, such as running a heat engine in reverse. Other tools and techniques may also be utilized, such as exposing the storage tank and/or combiner to an ambient temperature that may induce a phase transition in the storage material.

These embodiments of a thermal enhancement system may be configured to couple through a thermal couple to different devices including, but not limited to, a refrigeration device, a freezer device, an electrical generator (e.g., heat-engine based electrical generator, a fuel-cell based electrical generator, and/or a photovoltaic-based electrical generator), and/or a heat engine.

Some embodiments of the thermal enhancement system may include the storage material. Some embodiments utilize water as a storage material. The storage material may include, but is not limited to: water, an organic liquid, an ionic liquid, an inorganic liquid, $CO_2$, DMSO, a mixture of miscible materials, and/or a surfactant stabilized mixture of immiscible materials.

Different freeze point suppressants may be utilized by a thermal enhancement system in accordance with various embodiments, including ionic materials. The FPS may include a pure or mixed material that may chemically suppresses the freeze point of the SM. A FPS may include, but is not limited to: water, ammonia, a salt, a non-salt soluble solid, an organic liquid, an inorganic liquid, a mixture of miscible materials, and/or a surfactant-stabilized mixture of immiscible materials.

A separator in a thermal enhancement system in accordance with various embodiments may separate the storage material and freeze point suppressant utilizing a membrane process to separate the storage material and freeze point suppressant. Other separation techniques may be utilized by a separator may include, but is not limited to, separating the storage material and freeze point suppressant utilizing at least a photosensitive process to separate the storage material and freeze point suppressant, a distillation process to separate the storage material and the freeze point suppressant, a liquid-liquid extraction process to separate the storage material and freeze point suppressant, and/or a chemically induced solubility change extraction process to separate the storage material and freeze point suppressant. In some cases, a separator may include multiple devices and/or components that may couple with the other aspects of thermal enhancement system.

Thermal enhancement system embodiments may also be configured in some cases as a thermal enhancement device(s). A thermal enhancement device(s) in accordance with various embodiments may include, for example: means for storing a storage material; means for inducing a phase transition in the storage material; means for combining the phase-transitioned storage material with a freeze point suppressant; means for thermally coupling the combined phased-transitioned storage material and freeze point suppressant with a device to boost the device; and/or means for separating the combined phased-transitioned storage material and freeze point suppressant.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This description provides examples, and is not intended to limit the scope, applicability or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Tools and techniques are provided for thermal enhancement that may be used to boost a device. Boosting a device and/or thermal enhancing a device may include absorbing heat from the device. Through absorbing heat from a device, the efficiency of an electrical generation system, other thermodynamic systems, and/or devices may be boosted. This may include improving the efficiency of some devices. Some embodiments may be economically beneficial. In general, the systems to boost an electrical generation system, other thermodynamic systems, and/or devices may be referred to as a thermal enhancement system.

Some embodiments provide for shifting the time of availability of electricity. This may be accomplished using devices that work as batteries: taking electricity and storing it in a reversible process until it is needed. In this process, the basic need may be the on-demand increase in electrical availability due to the battery being discharged. Some embodiments disclosed here produce the same effect, but by boosting the output of already operating equipment. The end result may be the same: increased electrical availability. The boosting and/or thermal enhancement tools and techniques disclosed that may provide for shifting the availability of electricity may be accomplished by a cyclical boosting method involving two mixed materials and an array of process equipment. Electricity may be consumed at one time and then made available at a later time via the boosting of an electrical generator or consumer. Other embodiments may utilize the boosting methods, systems, and devices for other purposes besides shifting electrical availability. For example, the tools and techniques in general may be utilized to absorb heat from a system at different types, which may benefit different devices, including but not limited to refrigeration devices, freezer devices, heat engines, and/or electrical generators.

Figure 1A:
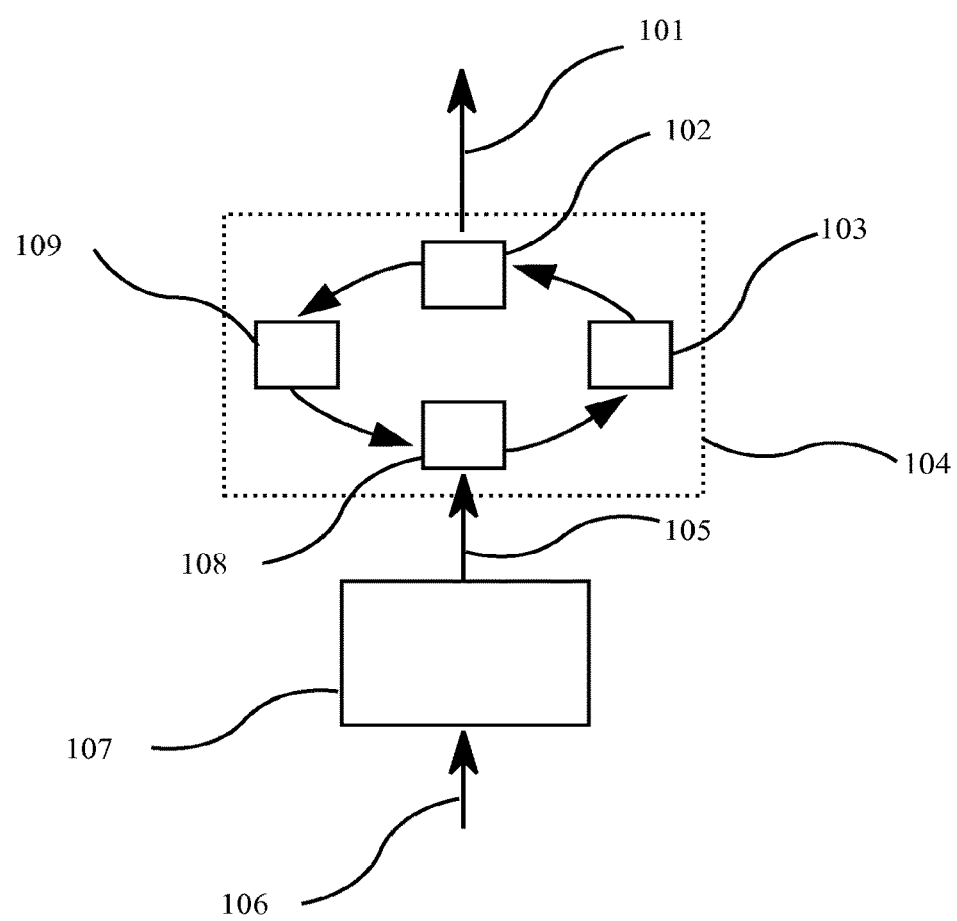
FIG. 1A shows a block diagram of system in which the multi-stage cycle may be used to boost a electric conversion device in accordance with various embodiments.
Figure 1B:
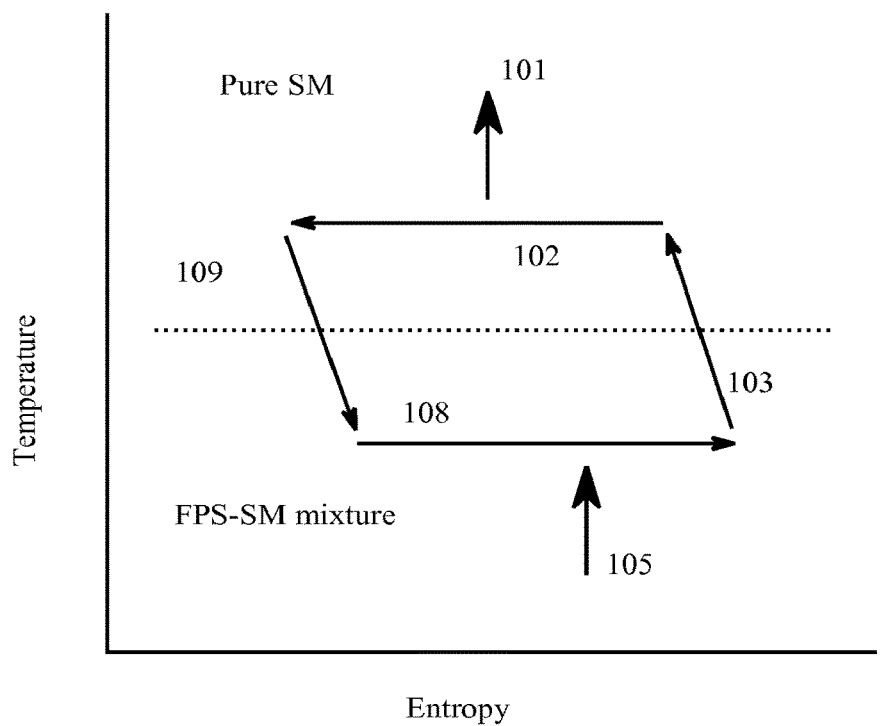
FIG. 1B shows the multi-stage cycle on a temperature entropy diagram given the two mixed and unmixed states of the system in accordance with various embodiments.

Some embodiments of the thermal enhancement method include materials that may undergo a multi-stage cycle. FIG. 1A and/or FIG. 1B may show examples of this. FIG. 1A shows a block diagram 100-$a$ of system in which the multi-stage cycle may be used to boost a device 107 in accordance with various embodiments. FIG. 1B shows a multi-stage cycle 100-$b$ on a temperature entropy diagram given a two mixed and unmixed states of the system in accordance with various embodiments. Some embodiments utilizing materials that may include a storage material (SM) and a freeze point suppressant (FPS). The SM may include a pure or mixed material that may undergo a phase change from fully or partially liquid to partially or fully solid upon cooling. The storage material may include, but is not limited to: water, an organic liquid, an ionic liquid, an inorganic liquid, CO2, DMSO, a mixture of miscible materials, and/or a surfactant stabilized mixture of immiscible materials. The FPS may include a pure or mixed material that may chemically suppresses the freeze point of the SM. This material may include, but is not limited to: water, ammonia, a salt, a non-salt soluble solid, an organic liquid, an inorganic liquid, a mixture of miscible materials, and/or a surfactant-stabilized mixture of immiscible materials. The device 107 may include, but is not limited to, a refrigeration device, an electrical generator (e.g., heat-engine based electrical generator, a fuel-cell based electrical generator, and/or a photovoltaic-based electrical generator), and/or a heat engine. In some cases, heat 106 may be brought into the system, while heat 101 may be dumped out of the system, such as to ambient. In some cases, boosting the device 107 includes absorbing heat 106.

These materials may be used in a multi-stage cycle that may allows electricity to be stored for a prescribed amount of time and then used to boost the performance of a thermal-electric conversion system like a heat engine or PV panel, for example. Some embodiments may include more or less cycle stages. Some embodiments may utilize one or more stages that may not complete a cycle. An example of a multi-stage cycle, in accordance with various embodiments includes:

The SM may be sufficiently cooled using a chiller so as to undergo a phase transition.

The FPS may be added to the partially or fully solid material in order to lower the freeze point of the mixture. Upon mixing, the temperature of the mixture may drop due to the entropically motivated melting of the SM.

The mixture of solid SM and FPS may be put in thermal contact with a device 107, such a refrigeration device, an electrical generator (e.g., heat-engine based electrical generator, a fuel-cell based electrical generator, and/or a photovoltaic-based electrical generator), and/or a heat engine, in order to absorb the heat 105 from the system and boost it—this may result in boosting device 107's conversion efficiency. This absorption may result in the melting of the original substance.

Using thermal, photonic, and/or pressure driven separation techniques, for example, the original substance may be separated from the freeze point suppressant in order to reset the system to its original state. This separation process may stand alone by itself, or it may "piggyback" off parallel thermal processes in the generator.

Embodiments that utilize a multi-stage cycle may be dependent on the combined operation of multiple pieces of process equipment. At each stage of the cycle, there may be many options capable of producing the same result. For example, during stage 103, a multi-effect distillation system may produce the same result (separated pure SM and FPS) as a reverse osmosis or nano-filtration system. Examples of possible process equipment at each stage may be given herein, though other possible process equipment may be utilized.

Stage 102: during this stage, a heat pump, ambient air, ambient water, or a multi-stage compression process may cool the SM.

Stage 109: during this stage, a variety of mixing tanks/in-line mixers may be used.

Stage 108: during this stage, the mixture of SM and FPS may enhance and/or boost a device 107, which may include, but is not limited to, a refrigerator, a freezer, heat engine, fuel cell, photovoltaic panel, and/or thermionic devices.

Stage 103: during this stage, the mixture of SM and FPS may be separated by a huge number of methods including, but not limited to: reverse osmosis, nano-filtration, photonic driven precipitation, precipitation by chemical reaction, precipitation by solubility change, surfactant absorption, ion exchange, activated carbon absorption, flash separation, distillation, multi-effect distillation, vapor compression distillation, evaporation, membrane distillation, gas permeable membrane separation, liquid-liquid extraction, gas stripping, fractional distillation, and freeze distillation, among others. These systems can be stand alone or integrated directly into the operation of the enhanced generator.

Multi-stage cycles in accordance with various embodiments can be used to provide time-delayed enhancement to a wide array of electric generation systems, for example. These systems may include, but are not limited to, heat engines, fuel cells, photovoltaics, and thermionics, but are not limited to those technology types. Instead, the multi-stage cycle can be applied to any electrical generator, which may be enhanced by the presence of a colder thermal sink then ambient temperature. Multi-stage cycles in accordance with various embodiments may be used to provide for cooling and/or freezing for refrigeration and/or freezer devices.

The thermal interface between the multi-stage cycle and the generator can take different forms depending on the type of SM, FPS, and/or generator used. This interface can be as simple as a direct thermal coupling through a direct or indirect heat exchanger, or it can be a more complicated connection. For example, the SM or FPS may be a material that is also used in the generator as a heat transfer fluid or working fluid. The SM or FPS may intimately interact with the turbo machinery of the generator and the separation of the SM and FPS may be a natural result of the operation of the generator.

The energy source for device 107 may be independent of the multi-stage cycle described here. It may include, but is not limited to: waste heat from an industrial process; waste heat from a separate energy generator; chemical fuel from a virgin or waste source; or solar sources.

Figure 2:
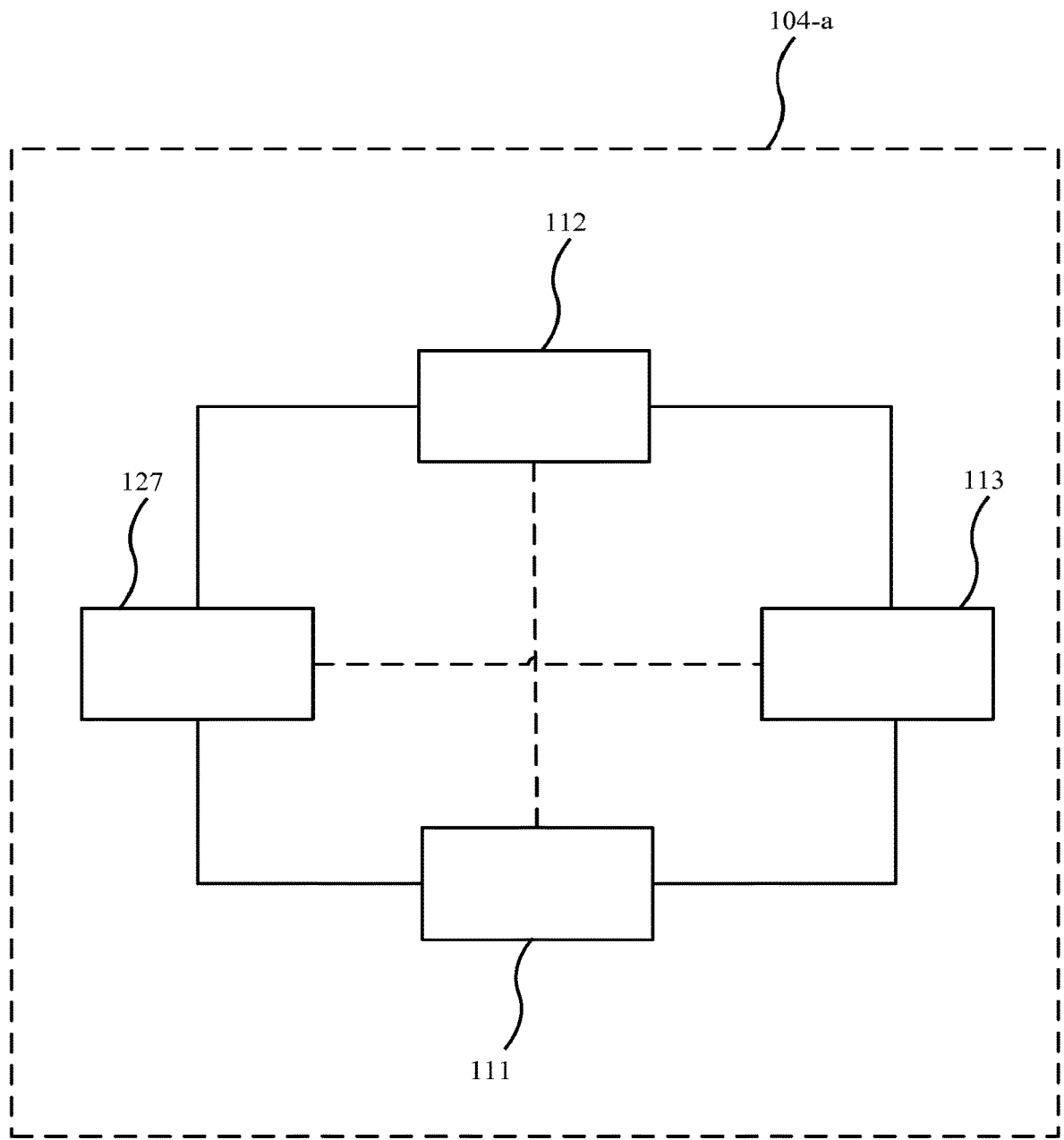
FIG. 2 shows a block diagram a thermal enhancement system and/or device in accordance with various embodiments.

Turning now to FIG. 2, a block diagram 200 of a thermal enhancement system 104-$a$ is shown in accordance with various embodiments. The system 104-$a$ may include a storage tank 112 that may store a storage material (SM). System 104-$a$ may also include a combiner 113 that combines the storage material that has undergone a phase transition with a freeze point suppressant (FPS). A thermal couple 111 that puts the combined storage material and freeze point suppressant in thermal contact with a device (such as device 107 shown in other figures). System 104-$a$ may also include a separator 127 that separates the combined storage material and freeze point suppressant. These components of system 104-$a$ may be coupled with each other in different ways such that the storage material, freeze suppressant material, and/or a mixture of storage material and freeze point suppressant may be moved between different components.

In some embodiments, storage tank 112 and/or combiner 113 may be coupled with a chiller to facilitate inducing the phase transition in the storage material. In some cases, the storage tank 112 and/or combiner 113 may be coupled with the device, such as device 107 as shown in other figures, to induce the phase transition, such as running a heat engine in reverse. Other tools and techniques may also be utilized, such as exposing the storage tank 112 and/or combiner to an ambient temperature that may induce a phase transition in the storage material.

Thermal enhancement system 104-$a$ may be configured to couple through thermal couple 111 to different devices including, but not limited to, a refrigeration device, a freezer, an electrical generator (e.g., heat-engine based electrical generator, a fuel-cell based electrical generator, and/or a photovoltaic-based electrical generator), and/or a heat engine.

Thermal enhancement system 104-$a$ may include the storage material. Some embodiments utilize water is a storage material. The storage material may include, but is not limited to: water, an organic liquid, an ionic liquid, an inorganic liquid, $CO_2$, DMSO, a mixture of miscible materials, and/or a surfactant stabilized mixture of immiscible materials.

Different freeze point suppressants may be utilized by thermal enhancement system 104-$a$ including ionic materials. The FPS may include a pure or mixed material that may chemically suppresses the freeze point of the SM. A FPS may include, but is not limited to: water, ammonia, a salt, a non-salt soluble solid, an organic liquid, an inorganic liquid, a mixture of miscible materials, and/or a surfactant-stabilized mixture of immiscible materials.

Separator 127 may separate the storage material and freeze point suppressant utilizing a membrane process to separate the storage material and freeze point suppressant. Other separation techniques may be utilized by separator 127 including separating the storage material and freeze point suppressant utilizing at least a photosensitive process to separate the storage material and freeze point suppressant, a distillation process to separate the storage material and the freeze point suppressant, a liquid-liquid extraction process to separate the storage material and freeze point suppressant, and/or a chemically induced solubility change extraction process. In some cases, separator 127 may include multiple devices and/or components that may couple with the other aspects of thermal enhancement system 104-a.

Figure 3A:
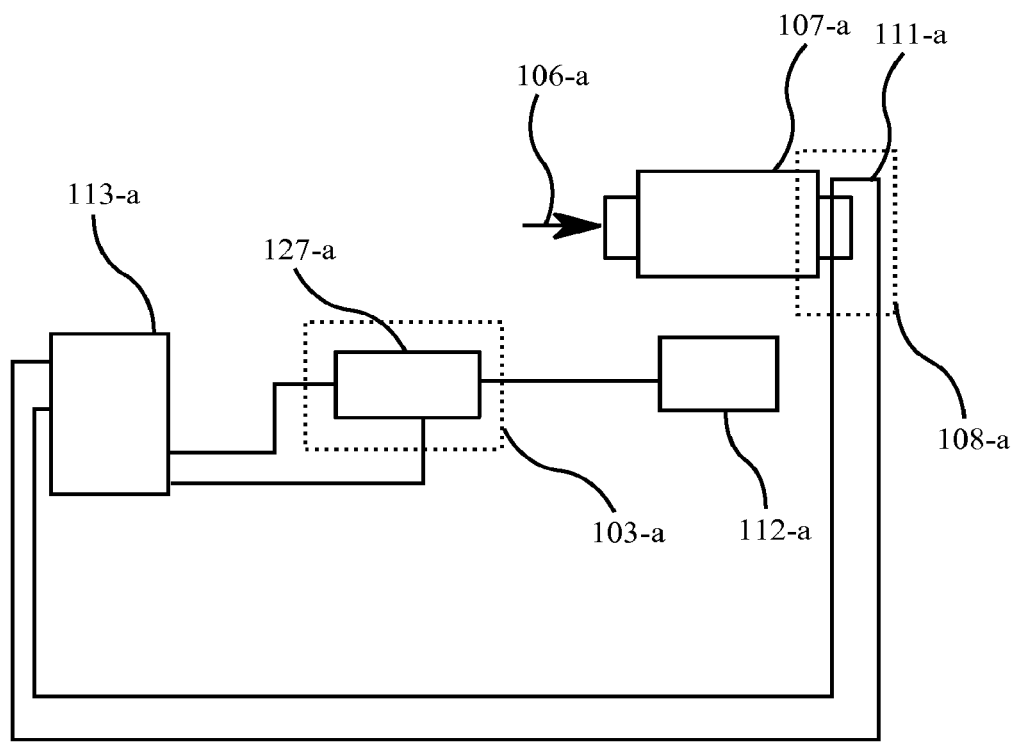
FIG. 3A and FIG. 3B show examples of thermal enhancement systems in accordance with various embodiments.
Figure 3B:
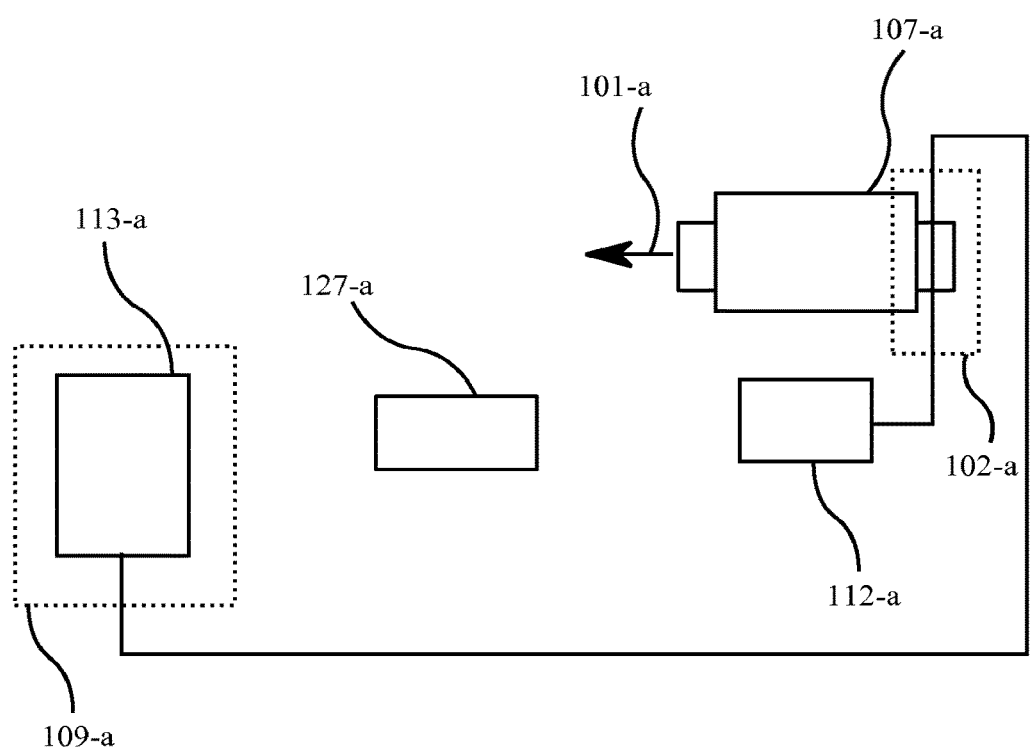

The following provides several different embodiments. The embodiments may be highly dependent of the application. For example, large-scale applications may be better suited by some embodiments while small scale applications may be better suited by others. In each of the embodiments, the choice of SM, FPS, device, energy source, and/or preparation technique may only be mildly dependent. In most cases, a different FPS, SM, device, energy source and/or separation technique may be used without significant architecture modification. In general, each embodiment may fit a generic system. Examples of systems in accordance with various embodiments may include the system 300-a of FIG. 3A and/or the system 300-b of FIG. 3B. FIG. 3A shows of a system 300-a in discharge phase and/or boost phase in accordance to various embodiments. During a discharge phase, heat 106-a may be absorbed into system 300-a. FIG. 3B shows a system 300-b in charge phase in accordance with various embodiments. During the charge phase, heat 101-a may be dumped out of the system 300-b. The following describes examples of systems 300-a and/or 300-b that may implement stages and/or systems as mentioned with respect to FIG. 1 and/or FIG. 2.

Stage 102-a: Water, for example, or other storage material may be removed from the water tank 112-a and frozen. The frozen water or frozen storage material may be stored for a prescribed amount of time in an insulated tank 113-a, with minimal melting in some cases. Some embodiments may utilize other storage materials, such as DMSO. In general, the storage material may include an organic liquid and/or inorganic liquid in which a phase transition, such as freezing, may be induced.

Stage 109-a: The ice may be brought into contact with a FPS in the ice tank 113-a. The freeze point of this mixture may be dictated by the properties of the mixture but may naturally approach an equilibrium temperature as the ice is entropically melted.

Stage 108-a: The SM and FPS mixture may be used to cool the condenser of the heat engine 107-a through thermal couple 111-a. In some cases, this may be done on demand. While this example utilizes a heat engine 107-a, other devices may be utilized including, but not limited to, a refrigeration device and/or electrical generator (e.g., heat-engine based electrical generator, a fuel-cell based electrical generator, and/or a photovoltaic-based electrical generator).

Stage 103-a: After boosting the performance of the heat engine 107-a through absorbing heat 106-a from the heat engine 107-a, the mixture may flow back to the ice tank 113-a and then to the FPS SM separator 127-a, or flow directly to the separator 127-a. In this process, the FPS and SM are separated and the SM flows to the water storage tank 112-a and the concentrated FPS flows back to the ice tank 113-a.

The following embodiments given may be used to illuminate explicit examples of process equipment that can fulfill the roles for each of these stages.

Figure 4A:
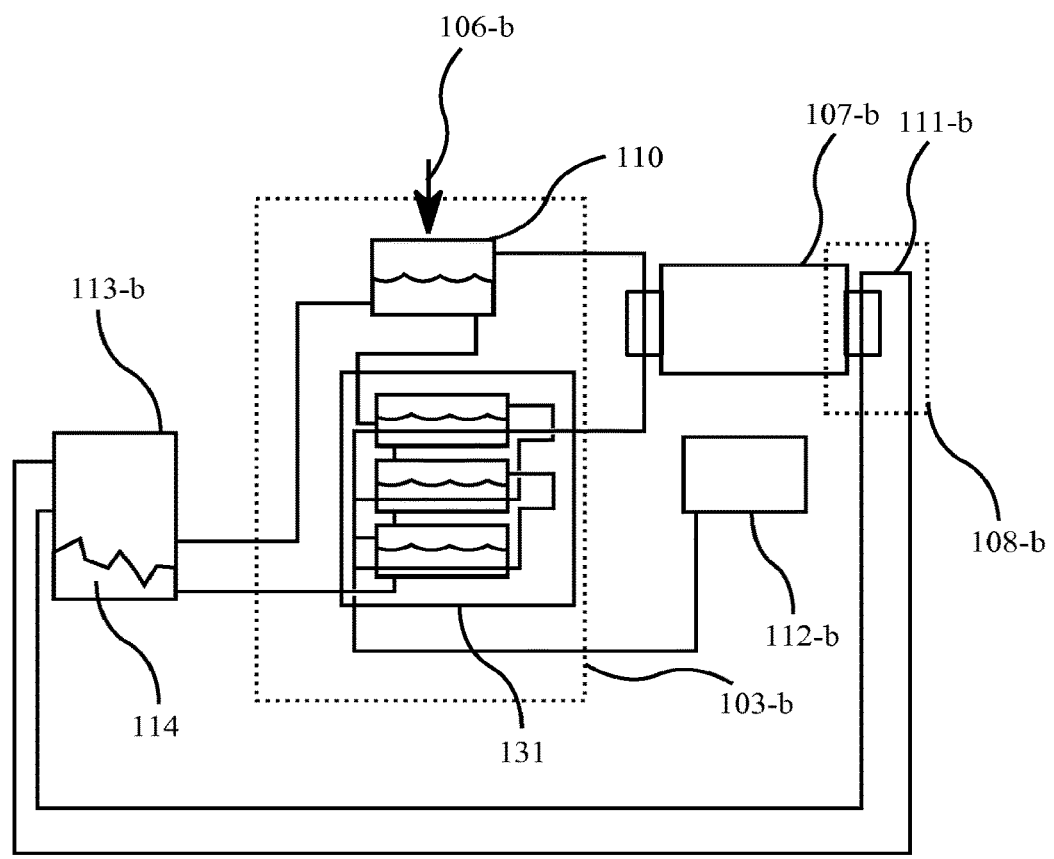
FIG. 4A and FIG. 4B show examples of thermal enhancement systems in accordance with various embodiments.
Figure 4B:
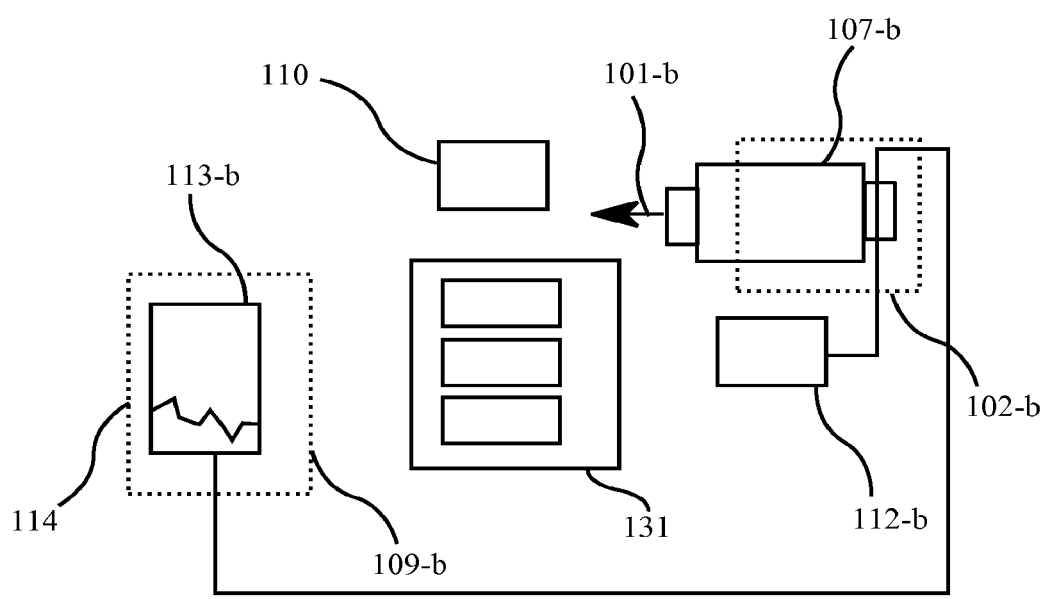

Another embodiment may utilize the following: SM: water; FPS: ionic substance (salt); device: stand-alone heat engine; energy source: waste heat; and/or FPS-SM separation: multi-effect distillation. In this embodiment, a stand-alone heat engine (like a stirling engine) may be enhanced by the multi-stage cycle using water as the SM and a salt as the FPS. In some cases, the ionic substance may include LiCl and/or CaCl2. FIG. 4A shows of a system 400-a in discharge phase and/or boost phase in accordance to various embodiments. During the discharge phase, heat 106-b may be absorbed into system 400-a. FIG. 4B shows a system 400-b in charge phase in accordance with various embodiments. During the charge phase, heat 101-b may be dumped out of the system 400-b. The following describes examples of systems 400-a and/or 400-b that may implement stages and/or systems as mentioned with respect to FIG. 1, FIG. 2, and/or FIG. 3. While systems 400-a and/or 400-b may be described utilizing specific SM, FPS, device, energy source, and/or FPS-SM separation techniques, this may be for clarity purposes and other storage materials, freeze point suppressants, devices, energy sources, and/or separation techniques may be utilized in some embodiments.

Stage 102-b: Water, which may be pure, may be removed from the water tank 112-b and frozen by the heat engine 107-b operating in reverse mode driven by electrical energy. The frozen water may be stored for a prescribed amount of time in an insulated tank 113-b with minimal melting.

Stage 109-b: The ice may be brought into contact with a mixture of brine (salt and water) and solid salt 114. The freeze point of this mixture may be dictated by the salt being used and the concentration of the brine, but can be as low as −50° C., for example. The mixture may naturally approach this temperature as the ice may be entropically melted until it may reach an equilibrium point with the brine. The ice may be mixed with the brine in proportion to reach a designated equilibrium point.

Stage 108-b: On demand, the ice, brine, and/or solid salt mixture may be used to cool the condenser of the heat engine 107-b via an indirect heat exchanger 111-b. As the ice melts, the brine composition may naturally be buffered by the solvation of more of the solid salt. Salts with enthalpy of dilutions above 0 may be used to add to the chilling effect by their endothermic nature. In this way, the ice, brine, solid salt mixture may stay at the designated equilibrium point until all the ice and solid salt are consumed and only brine remains.

Stage 103-b: While the waste heat driven heat engine may be operating, a piggybacked thermal multi-effect distillation process may separate the SM and FPS. This process may include the typical cascade of distillation boilers 131 at lower and lower pressures; distillation boilers 131 may be an example of one or more aspects of separator 127 as shown in other figures. The steam generated in each boiler may feed the subsequent boiler. The multi-effect distillation system may be driven off of the heat transfer process 110 between the waste heat and the heat engine; the heat transfer process 110 may be an example one or more aspects of separator 127 as shown in other figures. The results of this process may be concentrated brine that is sent back to the ice tank 113-b and/or pure water that may be sent to the water tank 112-b.

The heat engine 107-b used in this embodiment may be an organic rankine cycle (ORC), variable phase cycle (VPC), or stirling engine (SE), for example. Other heat engines, however, may be utilized. As the heat engine may be stand alone, the thermal interaction between the boosting material and the heat engine may be done via indirect heat exchangers.

Figure 5A:
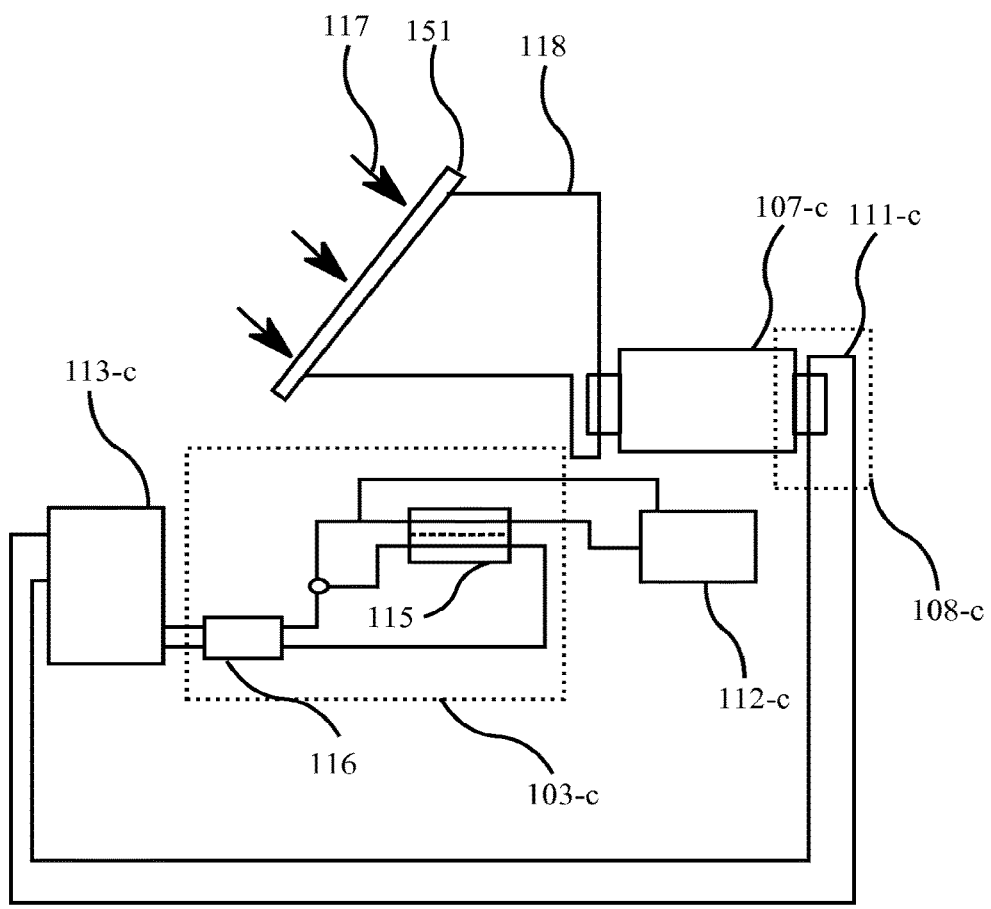
FIG. 5A and FIG. 5B show examples of thermal enhancement systems in accordance with various embodiments.
Figure 5B:
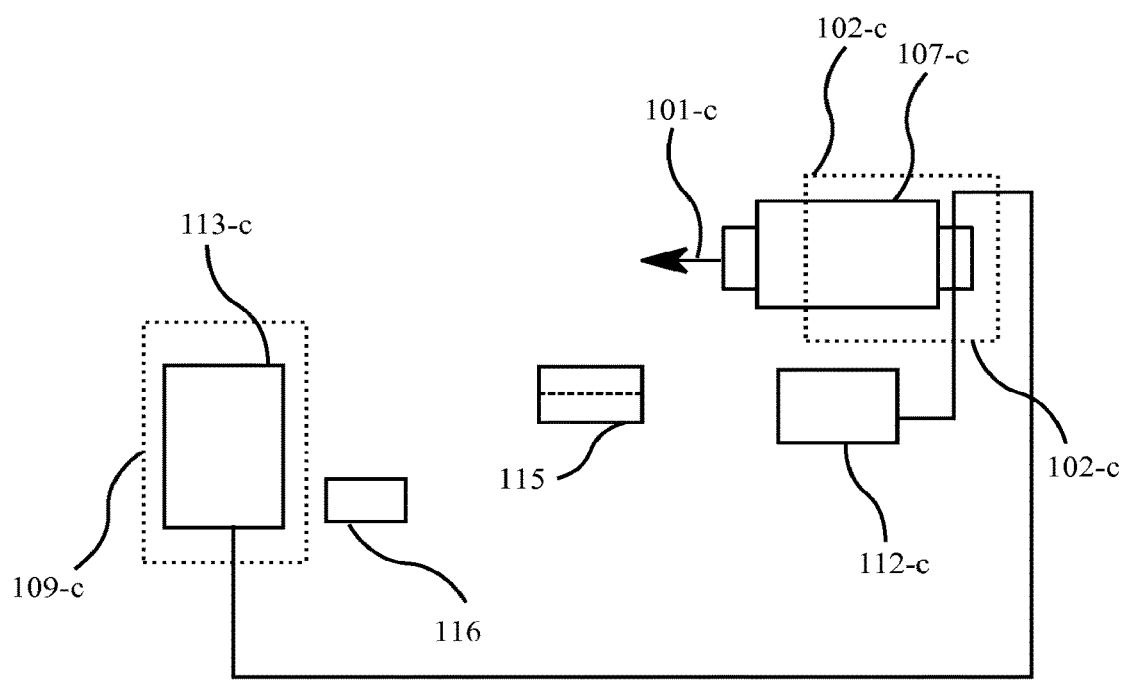

Another embodiment may utilize the following: SM: water; FPS: ammonia; device: stand-alone heat engine; energy source: PV waste heat; and/or FPS-SM separation: PH solubility change and gas permeable membrane separation. FIG. 5A shows a system 500-*a* in a discharge phase and/or boost phase of this embodiment. During a discharge phase, waste heat 118 (which may be example of heat 106 as shown in other figures) may be absorbed into system 500-*a*. FIG. 5B shows a system 500-*b* in a charge phase of this embodiment. During the charge phase, heat 101-*c* may be dumped out of the system 500-*b*. This embodiment may use a water SM with an ammonia FPS. The multi-stage cycle may boost the output of a standalone heat engine driven by the waste heat produced by a PV panel 151. The following describes examples of systems 500-*a* and/or 500-*b* that may implement stages and/or systems as mentioned with respect to FIG. 1, FIG. 2, and/or FIG. 3. While systems 500-*a* and/or 500-*b* may be described utilizing specific SM, FPS, device, energy source, and/or FPS-SM separation techniques, this may be for clarity purposes and other storage materials, freeze point suppressants, devices, energy sources, and/or separation techniques may be utilized in some embodiments.

- Stage 102-*c*: A slightly saline solution of pure water and a basic salt may be removed from the water tank 112-*c* and frozen by the heat engine 107-*c* operating in reverse mode driven by electrical energy. The freezing process may purify the water by freeze distillation and may concentrate the saline solution slightly. The frozen water may be stored for a prescribed amount of time in an insulated ice tank 113-*c* with minimal melting. The concentrated basic saline solution may be stored until it is needed in stage 103-*c*, for example.

- Stage 109-*c*: The pure ice may be mixed with ammonia rich water FPS, suppressing the melting point. The mixture may naturally approach this temperature as the ice may be entropically melted until it reaches an equilibrium point with the ammonia. The ammonia concentration may be managed actively by a system described in stage 103-*c*, for example.

- Stage 108-*c*: The ammonia water mixture may be used to cool a heat engine 107-*c* running off the waste heat 118 (which may be an example of heat 106 as shown in other figures) of a PV panel 151, which may absorb solar flux 117. The heat engine 107-*c* may be cooled via an indirect heat exchanger.

- Stage 103-*c*: The separation of the SM and the FPS in this embodiment may take place in several sub-stages. Liquid ammonia water mixture may be extracted from the SM–FPS mixture. This stream may be sent through an indirect regenerative heat exchanger 116 to bring its temperature up to near ambient. The stream may then be split into a prescribed fraction. This fraction may be mixed with a saline solution containing a small amount of basic salt raising its PH to 9-11, for example. This PH change may make the ammonia significantly less soluble in the water. The mixture may then be run through a membrane scrubber 115 where the rest of the non-saline SM+FPS mixture is flowing. This mixture may have excess capacity for ammonia and absorbs the ammonia from the saline solution through a membrane. The now concentrated ammonia water mixture may flow back through the regenerator 116 and may be cooled to near the equilibrium cold temperature reached in stage 109-*c*. membrane scrubber 115 and/or regenerator 116 be an example one or more aspects of separator 127 as shown in other figures. The now ammonia free saline solution may be stored in the water tank 112-*c* until stage 102-*c* may begin.

The heat engine 107-*c* used in this embodiment may be, among others, an organic rankine cycle (ORC), variable phase cycle (VPC), or stirling engine (SE). Other heat engines, however, may be utilized. As the heat engine may be stand alone, the thermal interaction between the boosting material and the heat engine may be done via indirect heat exchangers.

Figure 6A:
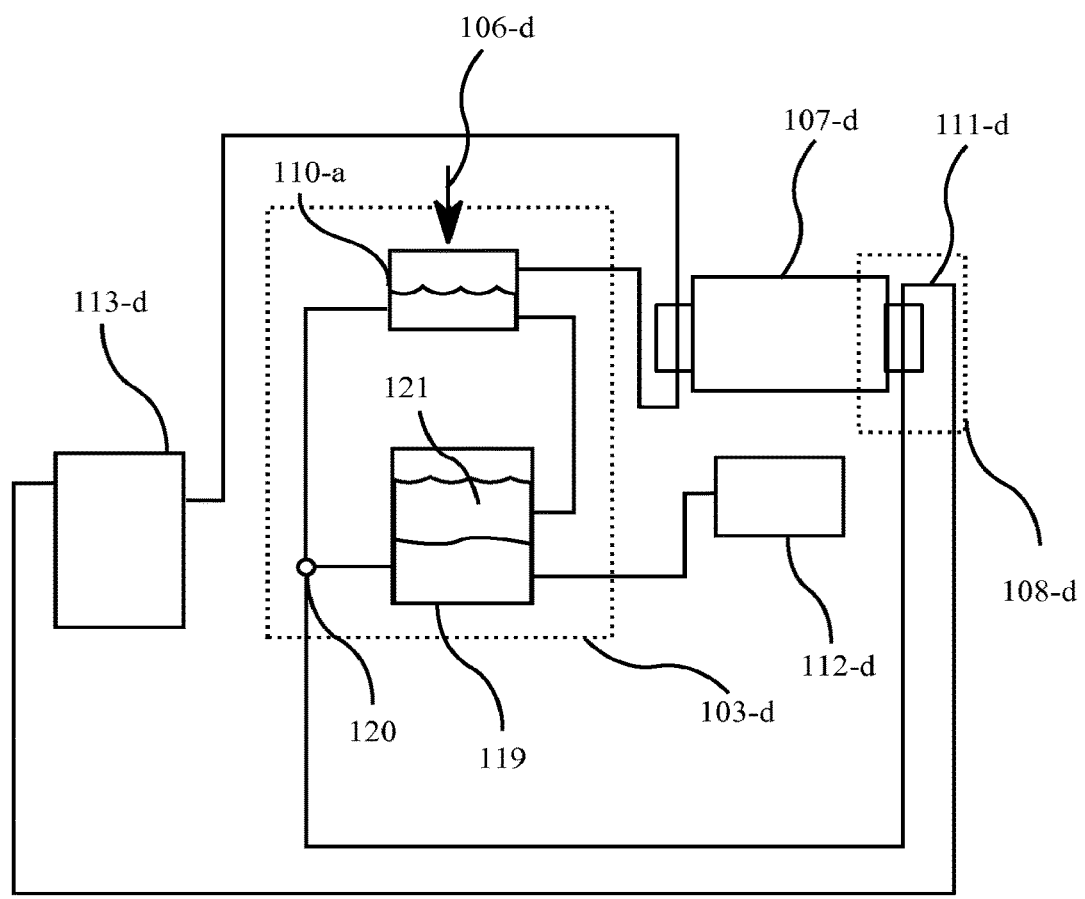
FIG. 6A and FIG. 6B show examples of thermal enhancement systems in accordance with various embodiments.
Figure 6B:
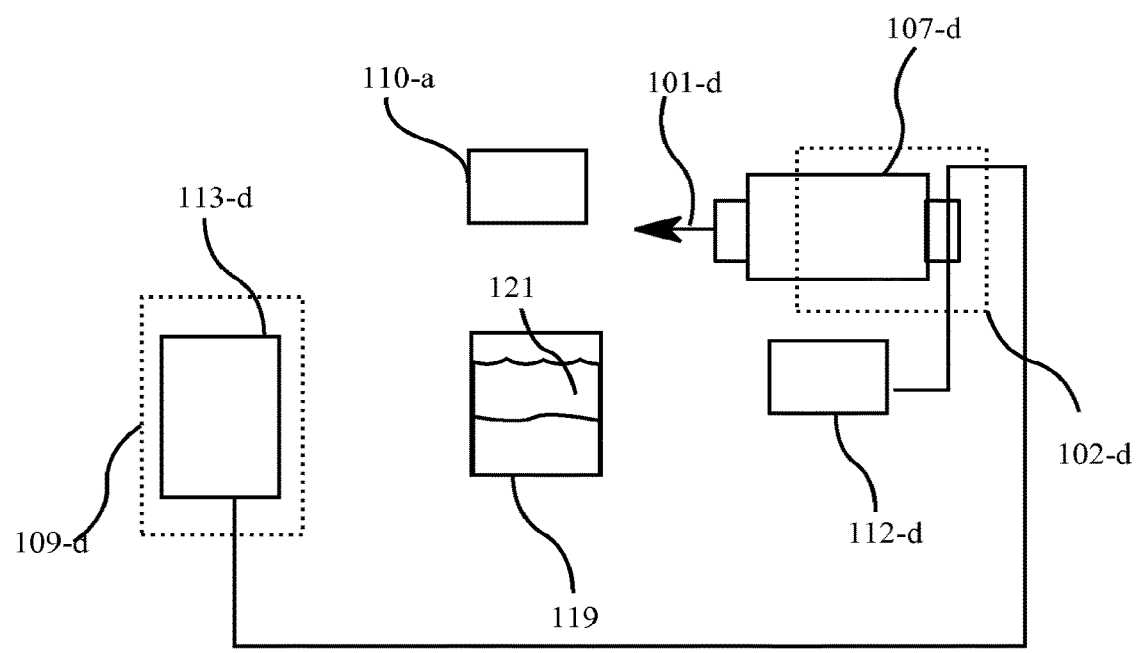

Another embodiment may utilize the following: SM: water; FPS: acetone; device: stand-alone heat engine; energy source: waste heat; and/or FPS-SM separation: liquid-liquid extraction. FIG. 6A shows a system 600-*a* in a discharge phase and/or boost phase of this embodiment. During a discharge phase, heat 106-*d* may be absorbed into system 600-*a*. FIG. 6B shows a system 600-*b* in a charge phase of this embodiment. During the charge phase, heat 101-*d* may be dumped out of the system 600-*b*. This embodiment may use a water SM with an acetone FPS. The multi-stage cycle may boost the output of a stand alone heat engine driven by the waste heat produced by a PV panel, for example. The following describes examples of systems 600-*a* and/or 600-*a* that may implement stages and/or systems as mentioned with respect to FIG. 1, FIG. 2, and/or FIG. 3. While systems 600-*a* and/or 600-*b* may be described utilizing specific SM, FPS, device, energy source, and/or FPS-SM separation techniques, this may be for clarity purposes and other storage materials, freeze point suppressants, devices, energy sources, and/or separation techniques may be utilized in some embodiments.

- Stage 102-*d*: Pure water may be frozen by the heat engine 107-*d* operating in reverse mode driven by electrical energy. The frozen water may be stored in an ice tank 113-*d* for a prescribed amount of time with minimal melting.

- Stage 109-*d*: The SM may be mixed with a strong solution of acetone in the ice tank 113-*d* suppressing its freeze point. The freeze point may be dependent on the concentration of the acetone. Upon contact, the mixture may entropically move towards the cold equilibrium point. Stage 103-*d* may control the acetone concentration of this mixture.

- Stage 108-*d*: The acetone water mixture may be used to cool a heat engine 107-*d* running off waste heat. The heat engine 107-*d* may be cooled via an indirect heat exchanger 111-*d*.

- Stage 103-*d*: The separation of the FPS and SM may be accomplished by liquid-liquid extraction. After cooling the engine 107-*d*, the FPS and SM may flow through a mixer 120 where it may be mixed thoroughly with a water-immiscible extraction fluid like trichloroethane. It then may flow into a separation vessel 119 where two discrete liquid layers form 121. The extraction fluid may be specifically chosen because it is both water immiscible and has a high acetone miscibility. Since the acetone may be significantly more soluble in the extraction fluid, it may migrate from the water layer to the extraction fluid layer in the separation vessel. The pure water may be stored until Stage 102-*d* in the water tank 112-*d*. The acetone filled extraction fluid may then be heated via "piggybacking" off the waste heat transfer process. It may first flow to a boiler 110-*a* heated by waste heat 106-*d*. Since the acetone and the extraction fluid may have dramatically different boiling points, the acetone may boils out of the solution at a very high purity. This concentrated acetone may be condensed by the heat engine 107-*d* and then sent back to the ice tank 113-*d* for use in stage 109-*d* while the now less concentrated extraction fluid may be sent to the mixer 120 and used to extract more acetone from the SM–FPS mixture. Separation vessel 119 and/or mixer 120 may be an example of one or more aspects of separator 127 as shown in other figures.

Figure 7A:
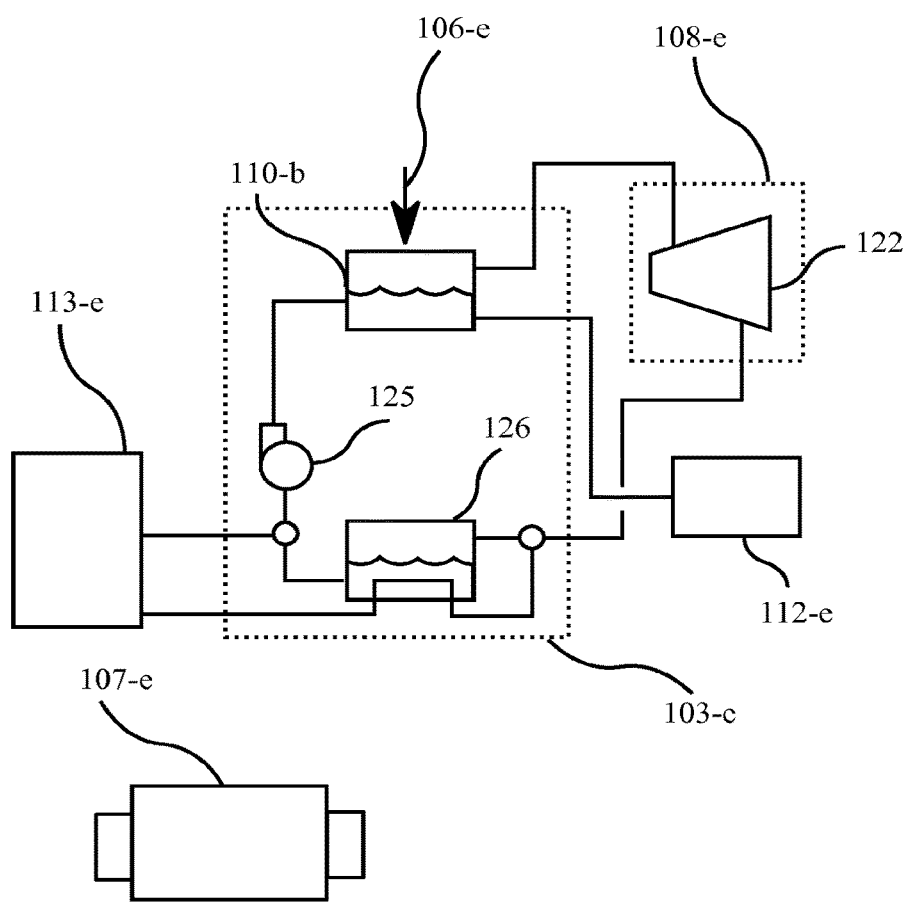
FIG. 7A and FIG. 7B show examples of thermal enhancement systems in accordance with various embodiments.
Figure 7B:
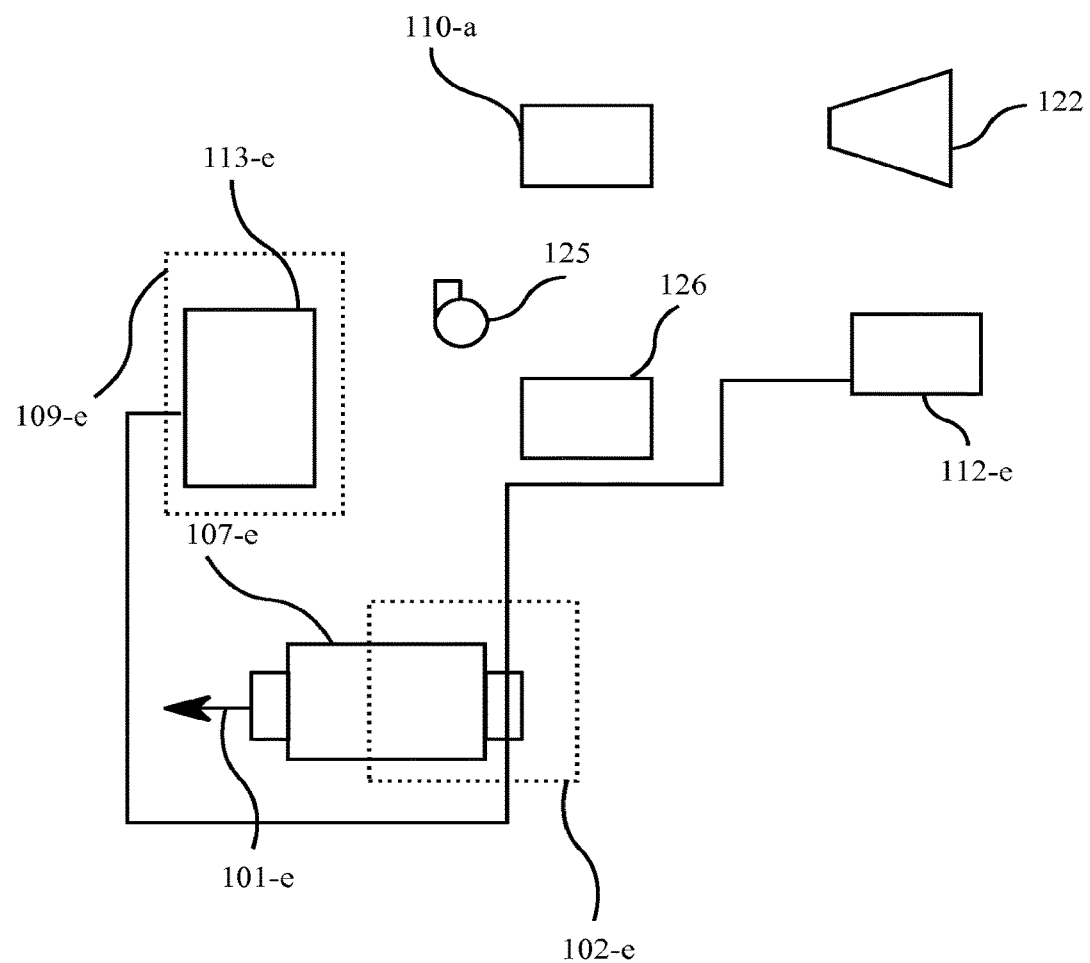

Another embodiment may utilize the following: SM: water; FPS: ammonia; device: interconnected heat engine; energy source: waste heat; and/or FPS-SM separation: integrated extraction. FIG. 7A shows a system 700-*a* in a discharge phase and/or boost phase of this embodiment. During a discharge phase, heat 106-*e* may be absorbed into system 700-*a*. FIG. 7B shows a system 700-*b* in a charge phase of this embodiment. During a charge phase, heat 101-*e* may be dumped out of the system 700-*b*. This embodiment may use a water SM with an ammonia FPS like some other embodiments. The multi-stage cycle may boost the output of an integrated heat engine driven by industrial waste heat, for example. The following describes examples of systems 700-*a* and/or 700-*b* that may implement stages and/or systems as mentioned with respect to FIG. 1, FIG. 2, and/or FIG. 3. While systems 700-*a* and/or 700-*b* may be described utilizing specific SM, FPS, device, energy source, and/or FPS-SM separation techniques, this may be for clarity purposes and other storage materials, freeze point suppressants, devices, energy sources, and/or separation techniques may be utilized in some embodiments.

- Stage 102-*e*: Water, which may be pure, may be frozen by a heat pump 107-*e*. The frozen water may be stored for a prescribed amount of time in the ice tank 113-*e* with minimal melting.
- Stage 109-*e*: In the ice tank 113-*e*, the ice, which may be pure ice, may be mixed with ammonia rich water FPS suppressing the melting point. The mixture may naturally approach this temperature as the ice may be entropically melted until it reaches an equilibrium point with the ammonia. The ammonia concentration may be managed actively by a system described in stage 103-*e*.
- Stage 108-*e*: In this stage, the ammonia water mixture may be used to cool the absorber 126 of an ammonia/water based power cycle. Lowering the temperature of this absorber may increase the efficiency of the cycle. Absorber 126 may be an example of thermal couple 111 as shown in other figures.
- Stage 103-*e*: After cooling the absorber 126, the FPS-SM mixture may be injected into the power cycle. This injection may take place at multiple locations. In this embodiment, the material may be injected at the inlet of the absorber 126. This may aid in the absorption of the saturated or partially liquid ammonia gas leaving the turbine 122. After full absorption, concentrated ammonia water mixture may be sent to both the ice tank 113-*e* and/or the power cycle pump 125. After the pump 125, the pressurized mixture may be sent to the waste heat fired boiler 110-*b*. This process may remove the ammonia from the water. The water may be extracted from the boiler and stored in the water tank 112-*e* until stage 102-*e* while the ammonia rich gas may be sent to the turbine 122. The water may be pure water in some cases. Components such as the pump 125, absorber 126, and/or boiler 110-*b* may be examples of separator 127 as shown in other figures in some cases.

Figure 8A:
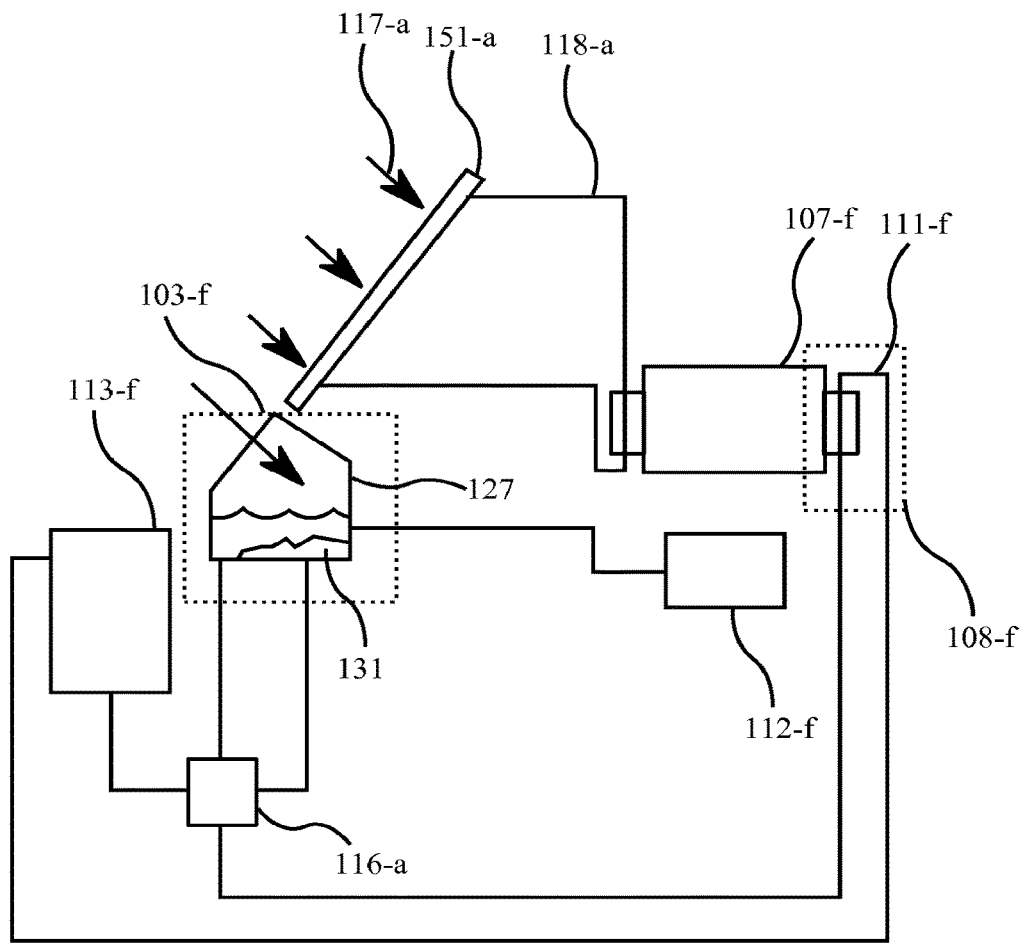
FIG. 8A and FIG. 8B show examples of thermal enhancement systems in accordance with various embodiments.
Figure 8B:
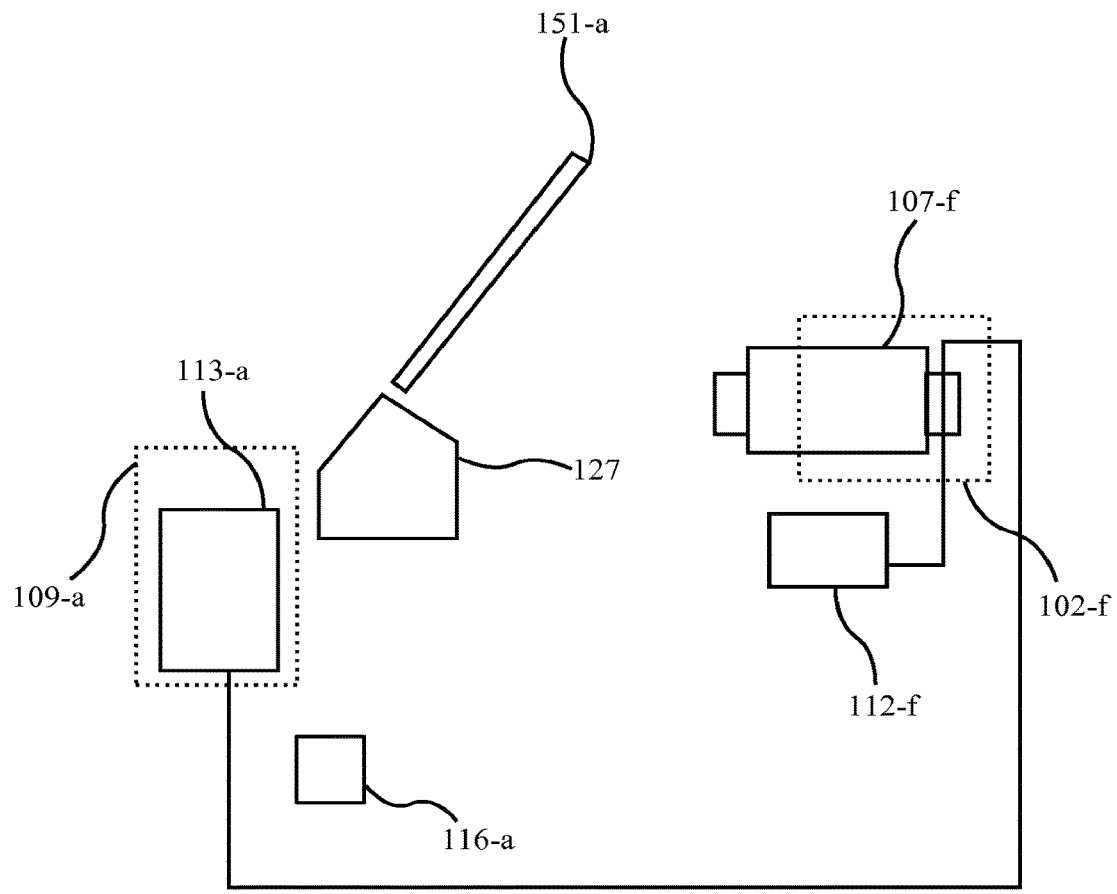

Another embodiment may utilize the following: SM: water; FPS: photo switchable material; device: stand-alone heat engine; energy source: Solar PV waste heat; and/or FPS-SM separation: photonic driven precipitation. FIG. 8A shows a system 800-*a* in a discharge phase and/or boost phase of this embodiment. FIG. 8B shows a system 800-*a* in a charge phase of this embodiment. This embodiment may use water as the SM and a photo switchable material as the FPS, for example. The multi-stage cycle may boost the output of a stand-alone heat engine driven by industrial waste heat. The following describes examples of systems 800-*a* and/or 800-*b* that may implement stages and/or systems as mentioned with respect to FIG. 1, FIG. 2, and/or FIG. 3. While systems 800-*a* and/or 800-*b* may be described utilizing specific SM, FPS, device, energy source, and/or FPS-SM separation techniques, this may be for clarity purposes and other storage materials, freeze point suppressants, devices, energy sources, and/or separation techniques may be utilized in some embodiments.

- Stage 102-*f*: Water, which may be pure, may be frozen by a heat pump 107-*f*. The frozen water may be stored for a prescribed amount of time in the ice tank 113-*f* with minimal melting.
- Stage 109-*f*: In the ice tank 113-*f*, the ice, which may be pure ice, may be mixed with a dark-miscible photoswitchable material suppressing the melting point. The mixture may naturally approach this temperature as the ice may be entropically melted until it may reach an equilibrium point with the FPS. The FPS concentration may be managed actively by a system described in stage 103-*f*.
- Stage 108-*f*: The SM–FPS mixture may be used to cool a heat engine 107-*f* running off solar PV waste heat 118-*a*. The heat engine 107-*f* may be cooled via an indirect heat exchanger 111-*f*.
- Stage 103-*f*: After cooling the heat engine 107-*f*, the mixture may be run through a regenerative heat exchanger 116-*a*, which may heat it to ambient temperature. The mixture then may run into an illuminated container 127 where the photoswitchable FPS may undergo a polarity change causing it to shift from miscible to immiscible 131. The FPS can then be removed from the water as it precipitates. Once in the dark, the FPS thermally may relax back to its miscible isomer, may be mixed with the appropriate amount of water, and may flow back to the ice tank 113-*f* via the regenerative heat exchanger 116-*a*. The water may be stored in the water tank 112-*f* to be used in stage 102-*f*. The thermal energy captured during the separation process may be used to power the heat engine in addition to the PV waste heat 118-*a* generated by solar flux 117-*a* striking a PV panel 151-*a*. Regenerator 116-*a* and/or illuminated container 127 may be an example of one or more aspects of separator 127 as shown in other figures.

Figure 9A:
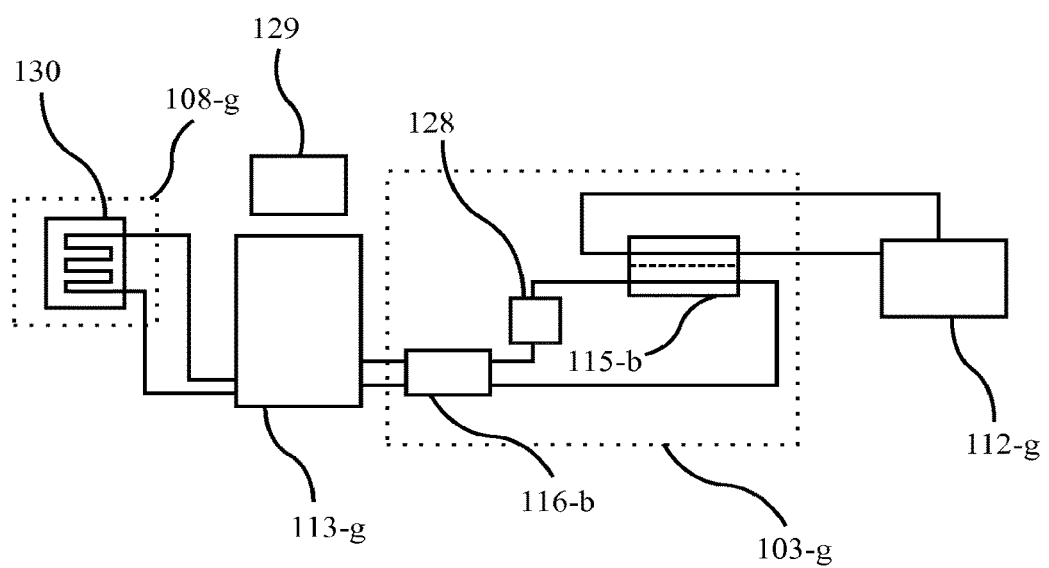
FIG. 9A and FIG. 9B show examples of thermal enhancement systems in accordance with various embodiments.
Figure 9B:
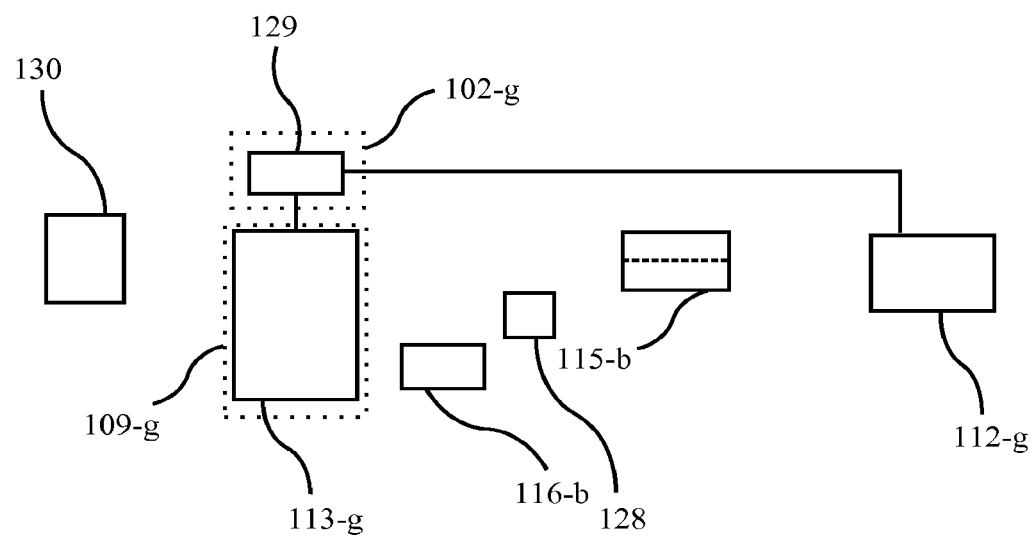

Another embodiment may utilize the following: SM: water; FPS: Ionic material; device: freezer; energy source: electricity FPS-SM separation: hydrophobic gas permeable membrane. FIG. 9A shows a system 900-*a* in a discharge phase and/or boost phase of this embodiment. FIG. 9B shows a system 900-*b* in a charge phase of this embodiment. This embodiment may use water as the SM and an ionic material as the FPS. The 4-stage cycle may boost the output of a freezer as to avoid the purchase of electricity, for example. The following describes examples of systems 1000- and/or 1000-*b* that may implement stages and/or systems as mentioned with respect to FIG. 1, FIG. 2, and/or FIG. 3. While systems 900-*a* and/or 900-*b* may be described utilizing specific SM, FPS, device, energy source, and/or FPS-SM separation techniques, this may be for clarity purposes and other storage materials, freeze point suppressants, devices, energy sources, and/or separation techniques may be utilized in some embodiments.

Stage 102-g: Water, which may be pure, may be frozen by an ice harvester 129. The frozen water may be stored for a prescribed amount of time in the ice tank 113-g with minimal melting, in some cases.

Stage 109-g: In the ice tank 113-g, the ice, which may be pure, may be mixed with an ionic material suppressing its freeze point. The mixture may naturally approach this temperature as the ice is entropically melted until it reaches an equilibrium point with the FPS. The FPS concentration may be managed actively by a system described in stage 103-g.

Stage 108-g: The SM-FPS mixture may be used to cool the environment inside a freezer 130 so that no electricity may be used. Freezer 130 may be an example of device 107 as shown in other figures.

Stage 103-g: After cooling the freezer, the mixture may be run through a regenerative heat exchanger 116-b, which may heat it to ambient temperature. The mixture may then be run into a heater 128 where it may be heated to the separation temperature. It then may be run through a gas permeable hydrophobic membrane 115-b where water vapor may be extracted and the brine may be concentrated. The water vapor may be condensed and stored in the water tank 112-g. Regenerator 116-b, heater 128, and/or membrane may be examples of one or more aspects of separator 127 as shown in other figures.

Some embodiments include a thermally bound renewable generator capable of providing electrical storage. The electrical energy being stored may be used to create a stored chilled material that subsequently enhances the conversion and dispatch of a solar renewable resource, for example. This may be done using a combination of thermally controlled photovoltaic, thermal, or thermionic solar absorbers, a storage system including one or more storage materials and vessels, and/or a thermal-electric converter.

Some examples of thermally bound renewable generators may involve the electrical storage enhanced renewable generator field. This field may include the overlap of the electrical storage and renewable energy generation fields. The electrical storage field may be populated by technologies that store electrical energy, where the renewable generator technical field may be populated by technologies that convert a renewable resource into electrical energy.

In the electrical storage area, the energy may come from grid tied or non-grid tied sources and may be stored for very short or long periods of time. These technologies may be considered "batteries" in the sense that they may be charged with some amount of energy and then discharge, at the most, the same amount of energy. Although these technologies may be considered batteries, there is a wide array of energy storage technologies that may use different storage mediums including chemical, kinetic, potential, and/or thermal.

In the renewable energy generation field, the technologies may utilize a wide variety of renewable energy sources including, but not limited to, wind, solar, biomass, tidal wave, and/or geothermal. These technologies may vary in their dispatchability, the amount of internal control they have over their electrical output, but may in general be considered direct renewable source to electrical energy converters. In general, they may take a set amount of energy from a renewable source and convert it to electricity at some efficiency less then 100%. While some technologies have the ability to store some of this energy locally and dispatch it to the grid when necessary, they may in general generate electricity proportionately to their renewable resource.

Some embodiments exist at the overlap of these two fields. Some embodiments may appear as electrical storage devices and at other times they may appear as a renewable generators. Methods, systems, and/or devices in accordance with various embodiments may involve charging by electrical energy and may return electrical energy to its charging source. Some embodiments may not be constrained to return only the quantity of energy that was consumed during charging. This may be because the methods, systems, and/or devices also may have many traits of a renewable generator. Like a renewable generator, some embodiments may convert a renewable energy stream to electrical energy. However, some embodiments may not be constrained to generate electricity in exclusive proportionality to its renewable energy stream.

Some embodiments include a thermal system that may combine thermal storage of grid electricity and thermal enhancement of a solar renewable resource, which may be utilized to achieve high efficiency solar to electric conversion and grid storage efficiency. This may be accomplished using a combination of thermal storage tanks, thermal storage materials, and/or various thermal-electric convention technologies. These system components may be arranged in such a way to reduce and/or minimize second order thermal losses, system size, and/or machinery complexity.

Some embodiments include a solar receiver, a hot side storage system, a thermal-electric converter, a cold side storage system and/or a grid powered chiller. Some embodiments may utilize other forms of chillers, such as the thermal enhancement systems discussed herein with respect to FIGS. 1-9.

Some embodiments include a solar receiver. This component may convert solar photonic energy into thermal, chemical, and/or electric. This process may be direct as in a thermal solar receiver or indirect via photovoltaic or photothermoionic waste heat, or example. The cold temperature achieved in the system may enhance the performance of these receivers and the photonic energy impingent on their surfaces may be converted at a significantly higher efficiency compared to conventional receivers.

In accordance with various embodiments, the hot side storage system may include a storage material and/or container to hold the storage material. This material may be a sensible, chemical or latent storage material used in a direct or indirect way. The thermal-electric converter may use a conventional Carnot limited thermal cycle to convert a fraction of the thermal energy passing between the hot and cold systems into electricity. The choice of this cycle may be dependent on the scale of the system. The working fluid used in this cycle may be similarly dependent and also can be the same as the hot or cold storage materials. The performance of this cycle may be enhanced by the cold temperature achieved in the system and the solar thermal energy can be converted at a significantly higher efficiency. The cold side storage system may include a storage material and/or container to hold the storage material. This material may be a sensible, chemical or latent storage material used in a direct or indirect way.

Some embodiments utilize gird-powered chiller that may introduce the grid power into the system. This component may remove energy from the cold storage material and reinitializes the charged state of the system. This chiller may be separate piece of equipment or can be the thermal-electric converter operating in reverse. It may also include some of the same components as the thermal-electric converter connected in a different orientation. Some embodiments may utilize a thermal enhancement system as discussed herein to remove energy from the cold storage material.

In general, a system in accordance with various embodiments begins in a pre-charged state. Energy, such as grid energy, may be used to remove energy from the cold side storage material. The solar receivers may collect thermal or chemical energy and may store that thermal energy in the hot side storage system. The temperature control of the indirect solar receivers may lead to a significant enhancement in performance. Some or all of the storage materials may be discharged into the thermal-electric converter. This may lead to electricity production from the thermal-electric converter as well as a return to the original, pre-charged, temperatures and states in the storage fluids.

Figure 10:
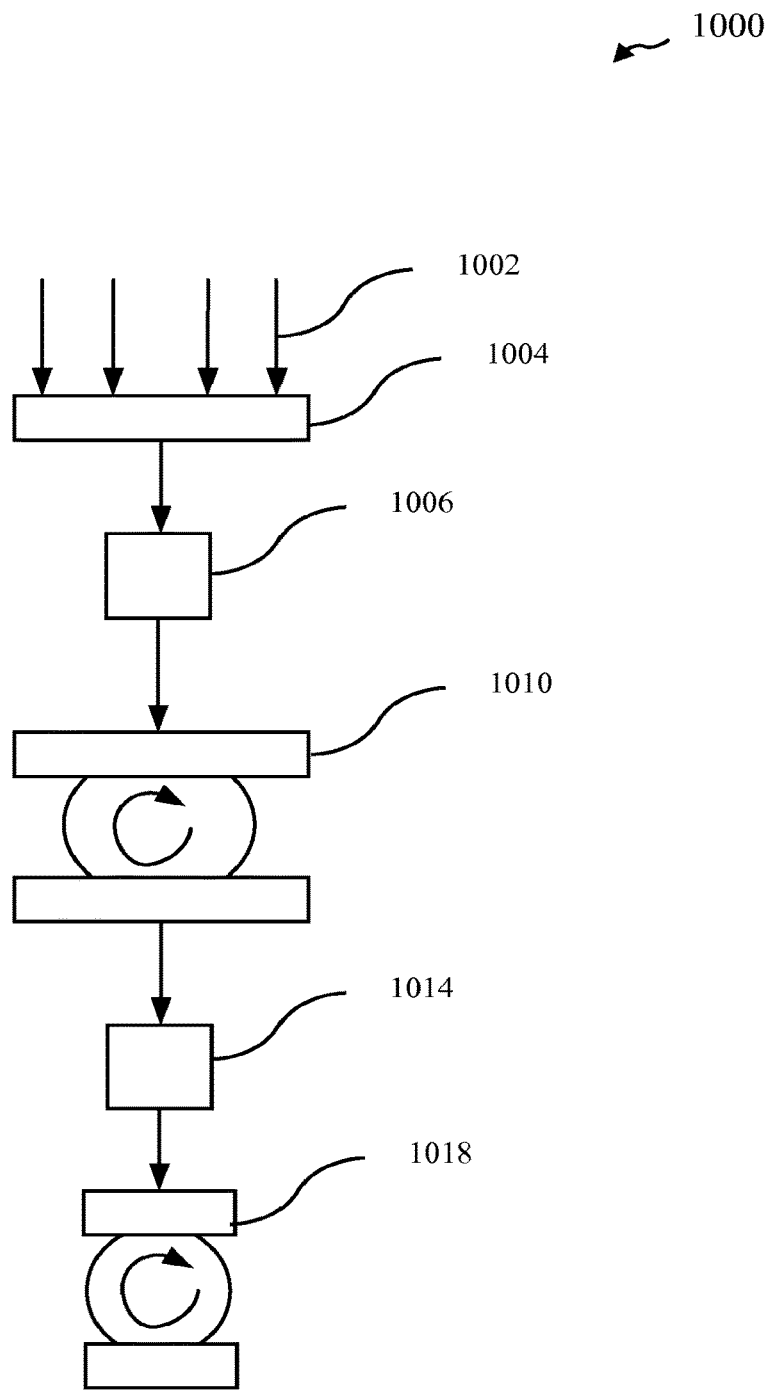
FIG. 10 shows a block diagram of a thermally bound system in accordance with various embodiments.

FIG. 10 shows a block diagram 1000 of a thermally bound system in accordance with various embodiments. First, solar insolation 1002 may hit a photovoltaic solar receiver or a thermal solar receiver 1004. The energy from this receiver may flow to the hot side storage system 1006. When desired, the energy may be sent to a thermal-electric converter 1010, which may be cooled by the cold side storage system 1014. When desired, the energy in the cold side storage system may be removed via a chiller 1018. In some cases, chill 1018 may be example of the thermal enhancement systems and/or devices discussed herein as with respect to FIGS. 1-9, for example.

Some embodiments may be dependent on the scale at which it is deployed. For example, residential scale systems may use different thermal-electric converters then systems deployed at municipality, industrial, and/or utility scale. As such, some embodiments may use different mechanical components and working fluids.

For example, for small-scale operations, sterling engines, vapor compression cycles, variable phase cycles, and/or other small scale systems may be utilized. Fluids to be used in small-scale systems may include, but are not limited to, water, ICE, alcohols, water/alcohol mixtures, water/ammonia mixtures, water/glycol mixtures and other mixtures and/or pure substances with low cost and low toxicity. These systems may be designed to use a single working and storage fluid or multiple storage and working fluids.

For medium scale operation, vapor compression cycles, variable phase cycles, organic rankine cycles, absorption cycles, and/or other mid-range thermal-electric conversion cycles may be utilized. Fluids to be used in medium scale systems may include, but are not limited to, water, ICE, alcohols, water/alcohol mixtures, water/ammonia mixtures, water/glycol mixtures and/or other mixtures or pure substances that may have low cost and/or low toxicity. These systems may be designed to use a single working and storage fluid or multiple storage and working fluids.

For large-scale operation, variable phase cycles, organic rankine cycles, rankine cycles, absorption cycles, brayton cycles, and/or other large thermal-electric conversion cycles may be utilized. Fluids to be used in large-scale systems include water, ICE, alcohols, water/alcohol mixtures, water/ammonia mixtures, water/glycol mixtures and/or other mixtures or pure substances with low cost and low toxicity. These systems can be designed to use a single working and storage fluid and/or multiple storage and working fluids.

Some embodiments thus include a system to perform both the conversion of solar energy into electricity and the storage of electricity via thermal mean. Some embodiments use the storage of electricity to enhance the conversion efficiency of solar energy into electricity. Some embodiments utilize direct or indirect thermal energy storage via a solid, gas, liquid, and/or phase change storage material.

Figure 11A:
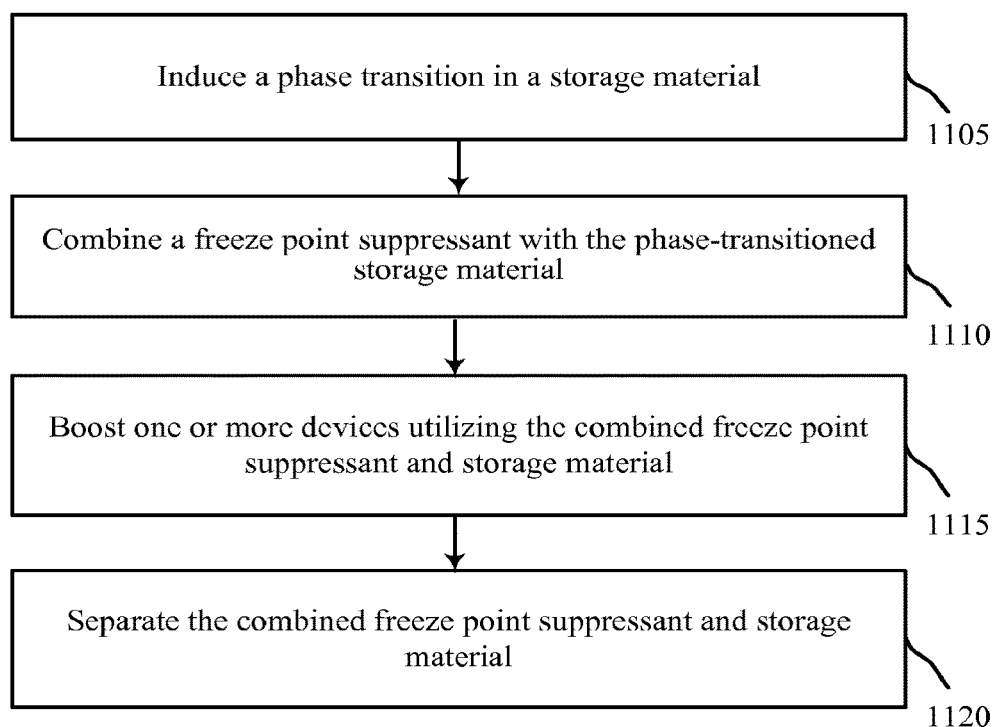
FIG. 11A shows a flow diagram of a method of thermal enhancement in accordance with various embodiments.

FIG. 11A shows a flow diagram of a method 1100-a of thermal enhancement in accordance with various embodiments. Method 1100-a may be implemented utilizing systems as those shown in FIG. 1-FIG. 10, for example.

At block 1105, a phase transition may be induced in a storage material. This may include partially or fully freezing the storage material, for example. At block 1110, a freeze point suppressant may be combined with the phase-transitioned storage material. At block 1115, one or more devices may be boosted utilizing the combined freeze point suppressant and storage material. This may also be referred to as the combined freeze point suppressant and phase-transitioned storage material. At block 1120, combined freeze point suppressant and storage material may be separated.

These blocks may be repeated in some cases after the separation occurs at block 1120, where the storage material that has been separated from the freeze point suppressant. For example, a phase transition may be induced in the storage material again after separating the combined freeze point suppressant and storage material. The freeze point suppressant may be combined with the phase-transitioned storage material. The one or more devices may be boosted thermally utilizing the recombined freeze point suppressant and storage material. The recombined freeze point suppressant and storage material may be separated after boosting the one or more devices.

In some configurations, inducing the phase transition in the storage material includes freezing the storage material. The one or more devices may include a refrigeration device. Boosting the refrigeration device may include reducing the temperature of the refrigeration device utilizing the combined freeze point suppressant and storage material.

In some configurations, the one or more devices may include an electrical generator. The electrical generator may include at least a heat engine based electrical generator, a fuel cell based electrical generator, and/or a photovoltaic based electrical generator. In some cases, the one or more devices may include a heat engine.

Method 1100-a may utilize a variety of storage materials including, but not limited to, water. The storage material may include at least an inorganic liquid or an organic liquid. Method 1100-a may utilize a variety of freeze point suppressants including, but not limited to, an ionic material. The freeze point suppressant may include at least an inorganic material or an organic material.

Method 1100-a may utilize a variety of techniques for separating the storage material and freeze point suppressant at block 1120 including, but not limited to, utilizing a membrane process to separate the storage material and freeze point suppressant. In some embodiments, the separating the storage material and freeze point suppressant utilizes a distillation process to separate the storage material and the freeze point suppressant. Separating the storage material and freeze point suppressant may utilize a membrane process to separate the storage material and freeze point suppressant. Separating the storage material and freeze point suppressant may utilize a photosensitive process to separate the storage material and freeze point suppressant. Separating the storage material and freeze point suppressant may utilize a liquid-liquid extraction process to separate the storage material and freeze point suppressant. Separating the storage material and freeze point suppressant may utilize a chemically induced solubility change extraction process to separate the storage material and freeze point suppressant.

Figure 11B:
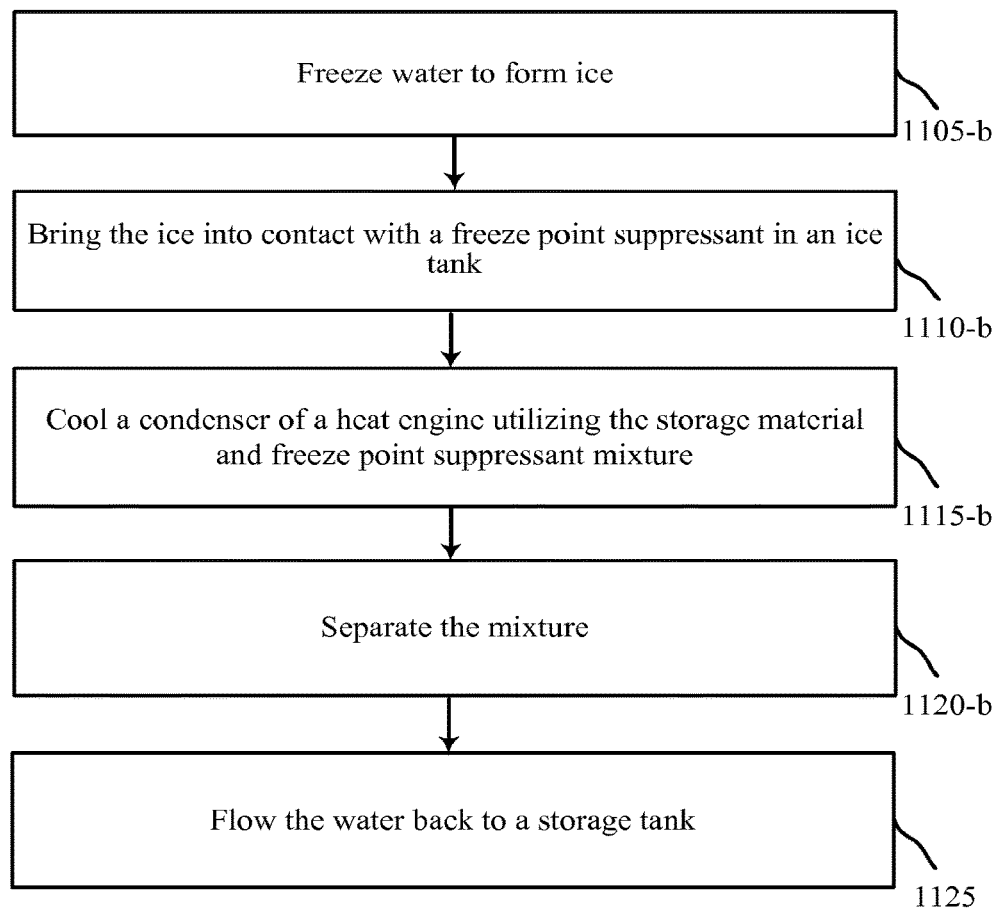
FIG. 11B shows a flow diagram of a method of thermal enhancement in accordance with various embodiments.

FIG. 11B shows a flow diagram of a method 1100-*b* of thermal enhancement in accordance with various embodiments. Method 1100-*b* may be implemented utilizing systems as those shown in FIG. 1-FIG. 10. For example, method 1100-*b* may be utilized with systems such as system 300-*a* of FIG. 3A and/or system 300-*b* of FIG. 3B. In some embodiments, method 1100-*b* provides an example of method 1100-*a*.

At block 1105-*b*, a storage material, such as water, may be removed from a storage tank and frozen. The frozen water may be stored for a prescribed amount of time in an insulated tank. At block 1110-*b*, the ice may be brought into contact with a freeze point suppressant in the ice tank. The freeze point of this mixture may be dictated by the properties of the mixture but may naturally approach an equilibrium temperature as the ice is entropically melted. At block 1115-*b*, the storage material and freeze point suppressant mixture may be used to cool the condenser of a heat engine through a thermal couple. At block 1120-*b*, after boosting the performance of the heat engine at block 1115-*b*, the mixture may flow back to the ice tank and then to the separator or flow directly to the separator. In this process, the freeze point suppressant and the storage material may be separated. At block 1125, the storage material may flow to the storage tank and the concentrated freeze point suppressant may flow back to the ice tank, which may also be referred to as the mixing tank and/or combining tank.

Figure 11C:
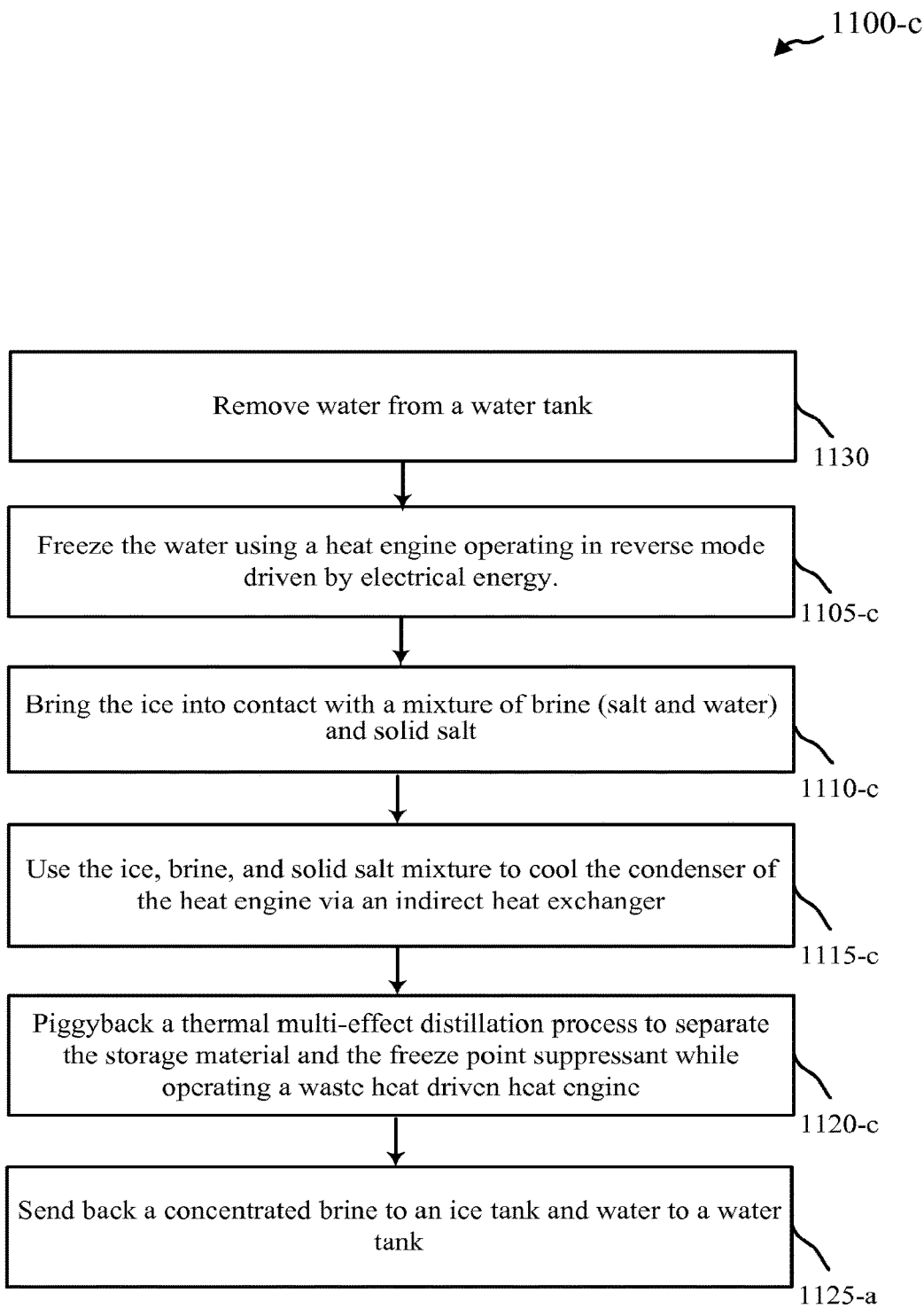
FIG. 11C shows a flow diagram of a method of thermal enhancement in accordance with various embodiments.

FIG. 11C shows a flow diagram of a method 1100-*c* of thermal enhancement in accordance with various embodiments. Method 1100-*c* may be implemented utilizing systems as those shown in FIG. 1-FIG. 10. For example, method 1100-*c* may be utilized with systems such as system 400-*a* of FIG. 4A and/or system 400-*b* of FIG. 4B. In some embodiments, method 1100-*c* provides an example of method 1100-*a*.

At block 1130, water may be removed from a water tank. Other embodiments may utilize other storage materials besides water including, but not limited to, DMSO. At block 1105-*c*, the water may be frozen by a heat engine operating in reverse mode driven by electrical energy. In some cases, the water may be pure water. The frozen water may be stored for a prescribed amount of time in an insulated tank, with minimal melting in some cases.

At block 1110-*c*, the ice may be brought into contact with a mixture of brine (salt and water) and solid salt. The freeze point of this mixture may be dictated by the salt being used and the concentration of the brine, but can be as low as −50° C., for example. The mixture may naturally approach this temperature as the ice may be entropically melted until it may reach an equilibrium point with the brine. The ice may be mixed with the brine in proportion to reach a designated equilibrium point.

At block 1115-*c*, the ice, brine, and/or solid salt mixture may be used to cool the condenser of the heat engine via an indirect heat exchanger. In some cases, this may be done on demand. As the ice melts, the brine composition may naturally be buffered by the solvation of more of the solid salt. Salts with enthalpy of dilutions above 0 may be used to add to the chilling effect by their endothermic nature. In this way, the ice, brine, solid salt mixture may stay at the designated equilibrium point until all the ice and solid salt are consumed and only brine remains.

At block 1120-*c*, a piggybacked thermal multi-effect distillation process may separate the storage material (water is in this example) and the freeze point suppressant (brine and/or salt in this example). This may be done while the waste heat driven heat engine may be operating. This process may include a cascade of distillation boilers at lower and lower pressures; distillation boilers may be example of one or more aspects of a separator. The steam generated in each boiler may feed the subsequent boiler. The multi-effect distillation system may be driven off of a heat transfer process between the waste heat and the heat engine; the heat transfer process may be an example one or more aspects of a separator. At block 1125-*a*, the results of this process may be concentrated brine that may be sent back to an ice tank and/or water (which may be pure) that may be sent to a water tank.

Figure 11D:
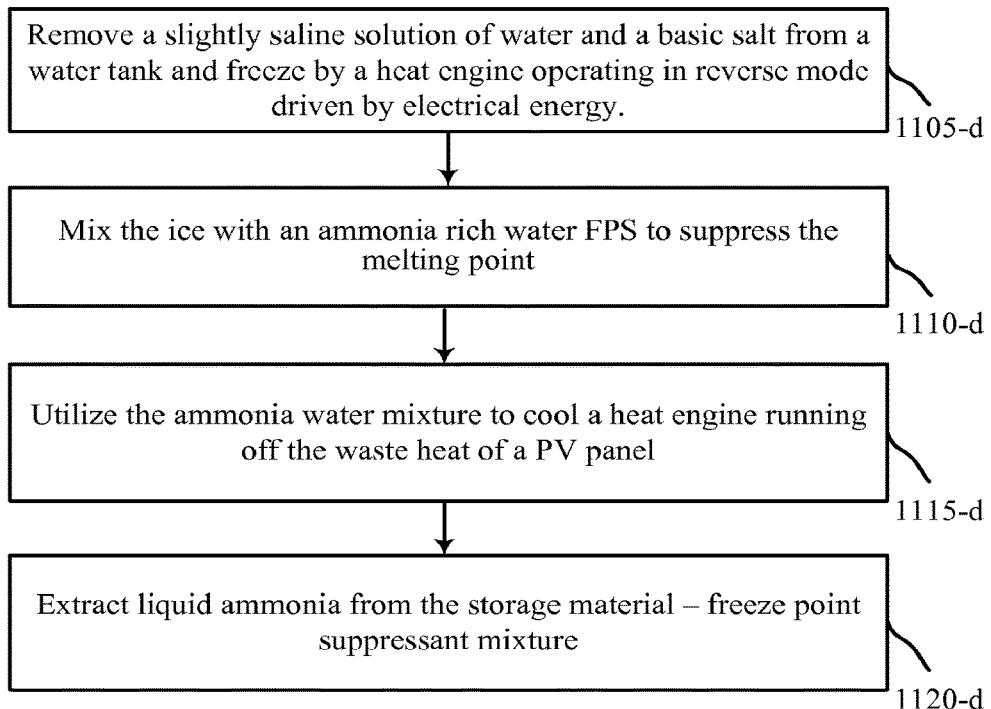
FIG. 11D shows a flow diagram of a method of thermal enhancement in accordance with various embodiments.

FIG. 11D shows a flow diagram of a method 1100-*d* of thermal enhancement in accordance with various embodiments. Method 1100-*d* may be implemented utilizing systems as those shown in FIG. 1-FIG. 10. For example, method 1100-*d* may be utilized with systems such as system 500-*a* of FIG. 5A and/or system 500-*b* of FIG. 5B. In some embodiments, method 1100-*d* provides an example of method 1100-*a*.

At block 1105-*d*, a slightly saline solution of water (which may be pure) and a basic salt may be removed from a water tank and frozen by a heat engine operating in reverse mode driven by electrical energy. The freezing process may purify the water by freeze distillation and may concentrate the saline solution slightly. The frozen water may be stored for a prescribed amount of time in an insulated ice tank with minimal melting, in some cases. The concentrated basic saline solution may be stored until it is needed, for example.

At block 1110-*d*, the ice may be mixed with an ammonia rich water FPS, suppressing the melting point. The mixture may naturally approach this temperature as the ice may be entropically melted until it reaches an equilibrium point with the ammonia. The ammonia concentration may be managed actively by a system below, for example.

At block 1115-*d*, the ammonia water mixture may be used to cool a heat engine running off the waste heat of a PV panel, which may absorb solar flux. The heat engine may be cooled via an indirect heat exchanger.

The separation of the SM and the FPS in this embodiment may take place in several sub-stages. At block 1120-*d*, liquid ammonia water mixture may be extracted from the SM–FPS mixture. This stream may be sent through an indirect regenerative heat exchanger to bring its temperature up to near ambient. The stream may then be split into a prescribed fraction. This fraction may be mixed with a saline solution containing a small amount of basic salt raising its PH to 9-11, for example. This PH change may make the ammonia significantly less soluble in the water. The mixture may then be run through a membrane scrubber where the rest of the non-saline SM+FPS mixture is flowing. This mixture may have excess capacity for ammonia and absorbs the ammonia from the saline solution through a membrane. The now concentrated ammonia water mixture may flow back through the regenerator and may be cooled to near the equilibrium cold temperature reached above. The now ammonia free saline solution may be stored in the water tank until block 1110-*d* may begin again in some cases.

Figure 11E:
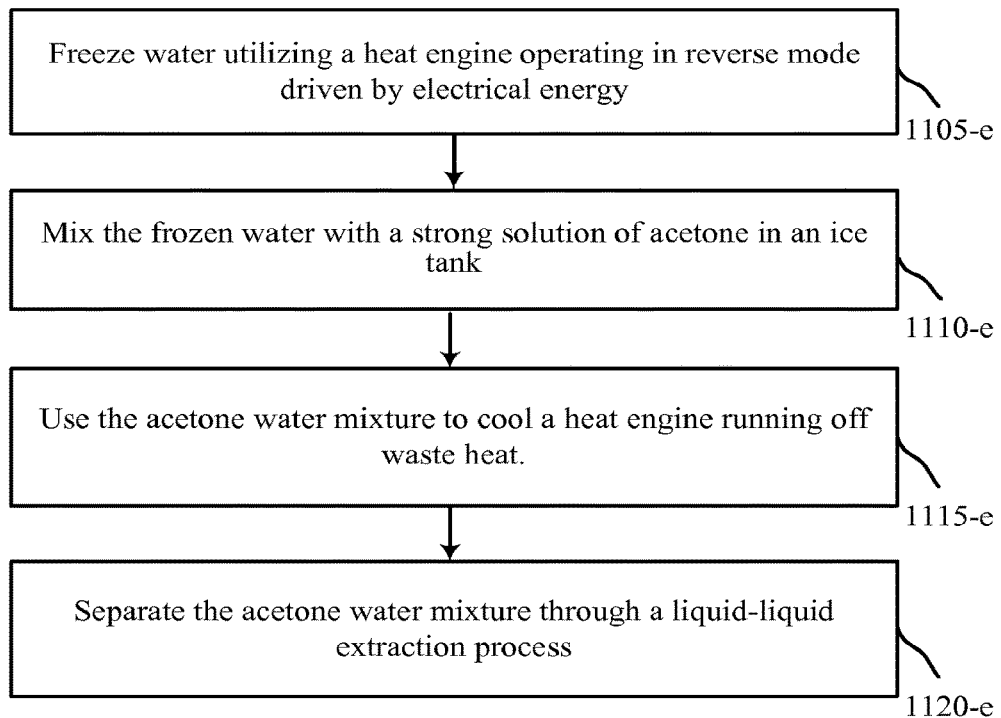
FIG. 11E shows a flow diagram of a method of thermal enhancement in accordance with various embodiments.

FIG. 11E shows a flow diagram of a method 1100-*e* of thermal enhancement in accordance with various embodiments. Method 1100-*e* may be implemented utilizing systems as those shown in FIG. 1-FIG. 10. For example, method 1100-*e* may be utilized with systems such as system 600-*a* of FIG. 6A and/or system 600-*b* of FIG. 6B. In some embodiments, method 1100-*e* provides an example of method 1100-*a*

At block 1105-*e*, water may be frozen by a heat engine operating in reverse mode driven by electrical energy. The water may be pure in some cases. The frozen water may be stored in an ice tank for a prescribed amount of time with minimal melting in some cases.

At block 1110-e, the frozen water may be mixed with a strong solution of acetone in an ice tank suppressing its freeze point. The freeze point may be dependent on the concentration of the acetone. Upon contact, the mixture may entropically move towards the cold equilibrium point. This stage may control the acetone concentration of this mixture. At block 1115-e, the acetone water mixture may be used to cool a heat engine running off waste heat. The heat engine may be cooled via an indirect heat exchanger.

At block 1120-e, the separation of the FPS and SM (i.e., the acetone water mixture) may be accomplished by liquid-liquid extraction. After cooling the engine, the FPS and SM may flow through a mixer where it may be mixed thoroughly with a water-immiscible extraction fluid like trichloroethane. It then may flow into a separation vessel where two discrete liquid layers form. The extraction fluid may be specifically chosen because it is both water immiscible and has a high acetone miscibility. Since the acetone may be significantly more soluble in the extraction fluid, it may migrate from the water layer to the extraction fluid layer in the separation vessel. The pure water may be stored until in the water. The acetone filled extraction fluid may then heated via "piggybacking" off the waste heat transfer process. It may first flow to a boiler heated by waste heat. Since the acetone and the extraction fluid may have dramatically different boiling points, the acetone may boils out of the solution at a very high purity. This concentrated acetone may be condensed by the heat engine and then sent back to the ice tank for use while the now less concentrated extraction fluid may be sent to the mixer and used to extract more acetone from the SM–FPS mixture.

Figure 11F:
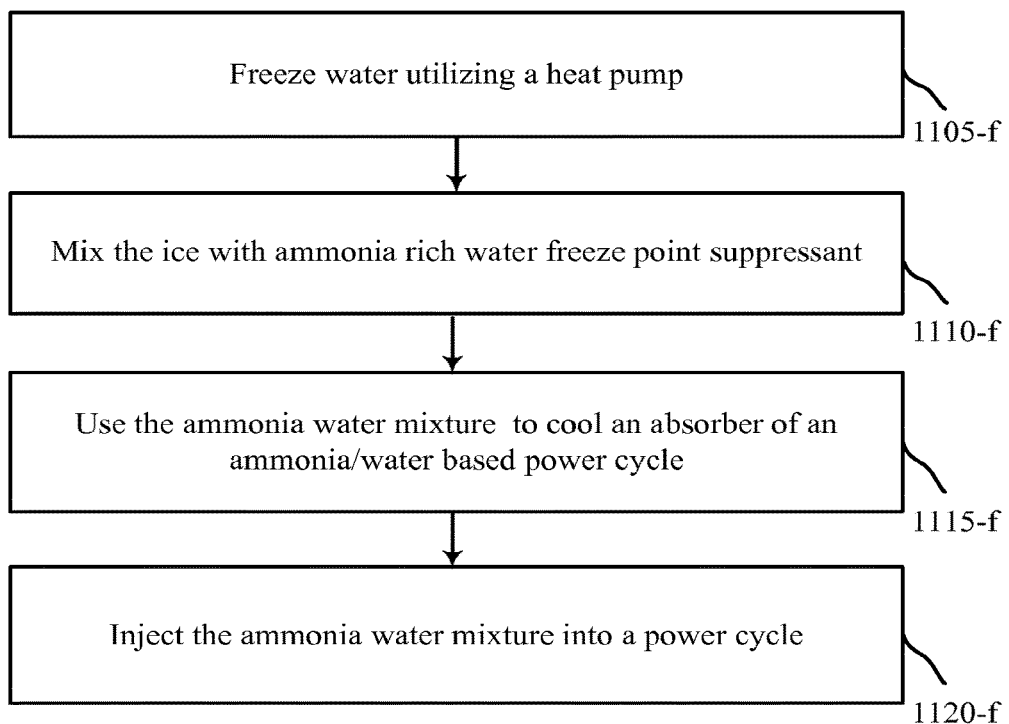
FIG. 11F shows a flow diagram of a method of thermal enhancement in accordance with various embodiments.

FIG. 11F shows a flow diagram of a method 1100-f of thermal enhancement in accordance with various embodiments. Method 1100-f may be implemented utilizing systems as those shown in FIG. 1-FIG. 10. For example, method 1100-f may be utilized with systems such as system 700-a of FIG. 7A and/or system 700-b of FIG. 7B. In some embodiments, method 1100-f provides an example of method 1100-a.

At block 1105-f, water may be frozen utilizing a heat pump. The water may be pure. The frozen water may be stored for a prescribed amount of time in the ice tank in some cases. At block 1110-f, the ice may be mixed with ammonia rich water FPS suppressing the melting point. The mixture may naturally approach this temperature as the ice may be entropically melted until it reaches an equilibrium point with the ammonia. The ammonia concentration may be managed actively in some cases.

At block 1115-f, the ammonia water mixture may be used to cool an absorber of an ammonia/water based power cycle. Lowering the temperature of this absorber may increase the efficiency of the cycle. At block 1120-d, after cooling the absorber, the FPS-SM mixture may be injected into the power cycle. This injection may take place at multiple locations. In this embodiment, the material may be injected at the inlet of the absorber. This may aid in the absorption of the saturated or partially liquid ammonia gas leaving a turbine. After full absorption, concentrated ammonia water mixture may be sent to both an ice tank and/or a power cycle pump. After the pump, the pressurized mixture may be sent to the waste heat fired boiler. This process may remove the ammonia from the water. The pure water may be extracted from the boiler and stored in a water tank (until it may be needed again) while the ammonia rich gas may be sent to the turbine.

Figure 11G:
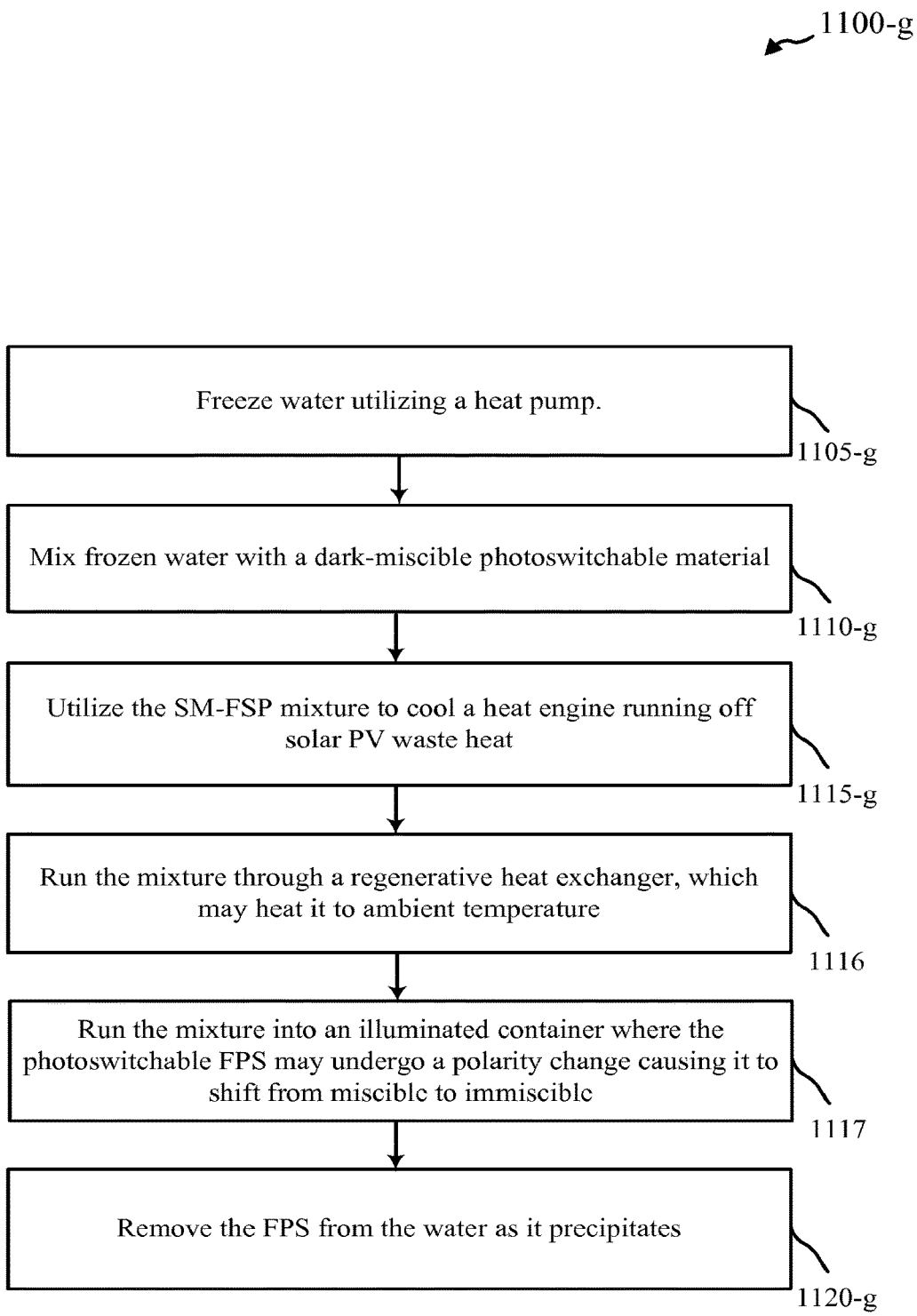
FIG. 11G shows a flow diagram of a method of thermal enhancement in accordance with various embodiments.

FIG. 11G shows a flow diagram of a method 1100-g of thermal enhancement in accordance with various embodiments. Method 1100-g may be implemented utilizing systems as those shown in FIG. 1-FIG. 10. For example, method 1100-g may be utilized with systems such as system 800-a of FIG. 8A and/or system 800-b of FIG. 8B. In some embodiments, method 1100-g provides an example of method 1100-a.

At block 1105-g, water, which may be pure, may be frozen by a heat pump. The frozen water may be stored for a prescribed amount of time in an ice tank, with minimal melting in some case At block 1110-g, in the ice tank, the ice, which may be pure ice, may be mixed with a dark-miscible photoswitchable material suppressing the melting point. The mixture may naturally approach this temperature as the ice may be entropically melted until it may reach an equilibrium point with the freeze point suppressant. The freeze point suppressant concentration may be managed actively in some cases. At block 1115-g, the SM–FPS mixture may be used to cool a heat engine running off solar PV waste heat. The heat engine may be cooled via an indirect heat exchanger.

At block 1116, after cooling the heat engine, the mixture may be run through a regenerative heat exchanger, which may heat it to ambient temperature. The mixture then may run into an illuminated container where the photoswitchable FPS may undergo a polarity change causing it to shift from miscible to immiscible at block 1117. The FPS can then be removed from the water as it precipitates at block 1120-g. Once in the dark, the FPS thermally may relax back to its miscible isomer, may be mixed with the appropriate amount of water, and may flow back to the ice tank via a regenerative heat exchanger. The water may be stored in the water tank. The thermal energy captured during the separation process may be used to power the heat engine in addition to the PV waste heat generated by a solar flux striking a PV panel.

Figure 11H:
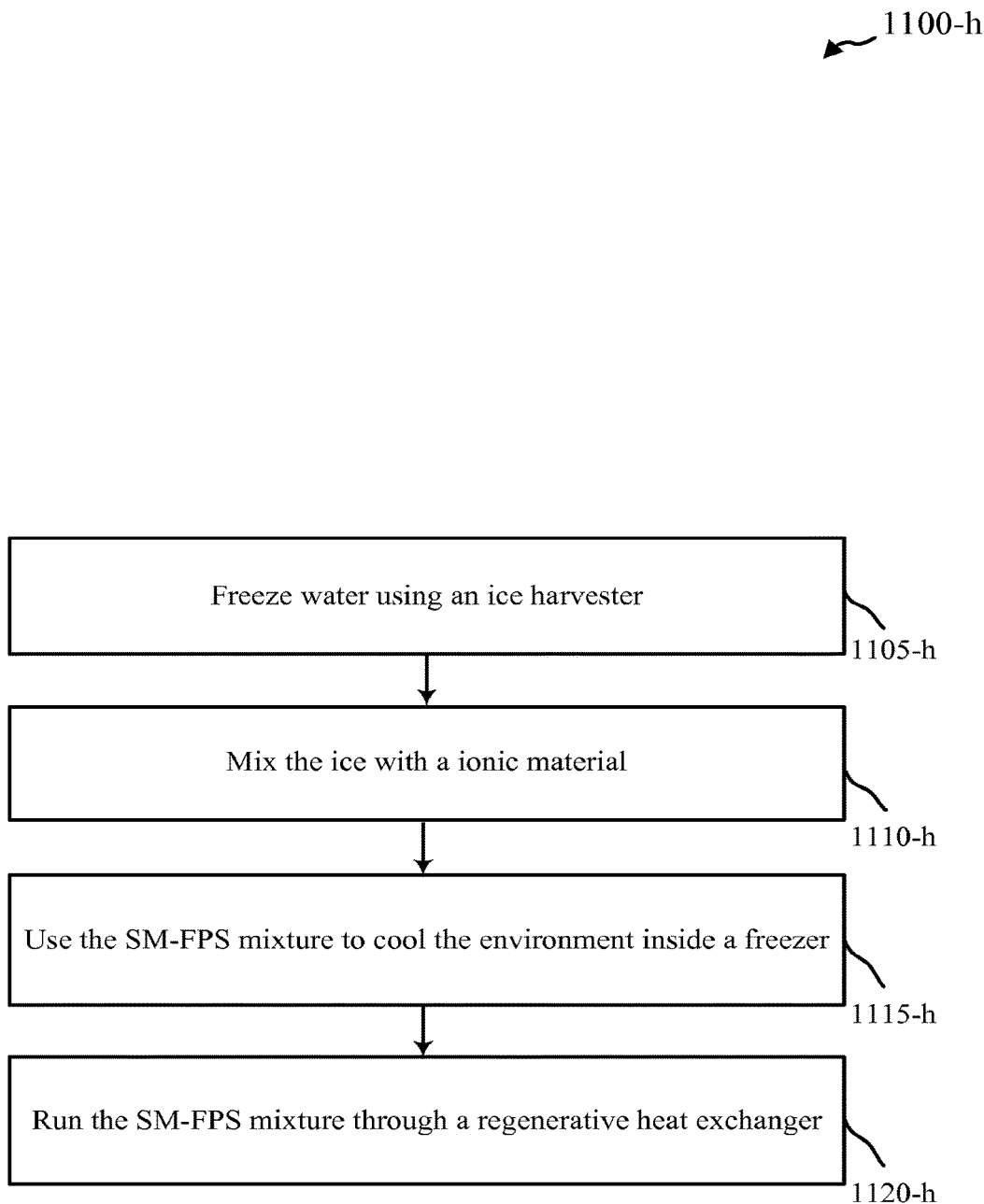
FIG. 11H shows a flow diagram of a method of thermal enhancement in accordance with various embodiments.

FIG. 11H shows a flow diagram of a method 1100-h of thermal enhancement in accordance with various embodiments. Method 1100-h may be implemented utilizing systems as those shown in FIG. 1-FIG. 10. For example, method 1100-h may be utilized with systems such as system 900-a of FIG. 9A and/or system 900-b of FIG. 9B. In some embodiments, method 1100-h provides an example of method 1100-a.

At block 1105-h, water or other storage material may be frozen by an ice harvester. The water may be pure. The frozen water may be stored for a prescribed amount of time in the ice tank, with minimal melting in some cases.

At block 1110-h, in the ice tank, the ice may be mixed with an ionic material suppressing its freeze point. The mixture may naturally approach this temperature as the ice is entropically melted until it reaches an equilibrium point with the FPS. The FPS concentration may be managed actively in some cases.

At block 1115-h, the SM–FPS mixture may be used to cool the environment inside a freezer and/or refrigerator so that no electricity may be used in some cases. At block 1120-h, after cooling the freezer and/or refrigerator, the mixture may be run through a regenerative heat exchanger, which may heat it to ambient temperature. The mixture may then be run into a heater where it may be heated to the separation temperature. It then may be run through a gas permeable hydrophobic membrane where water vapor may be extracted and the brine may be concentrated. The water vapor may be condensed and stored in a water tank.

Figure 11I:
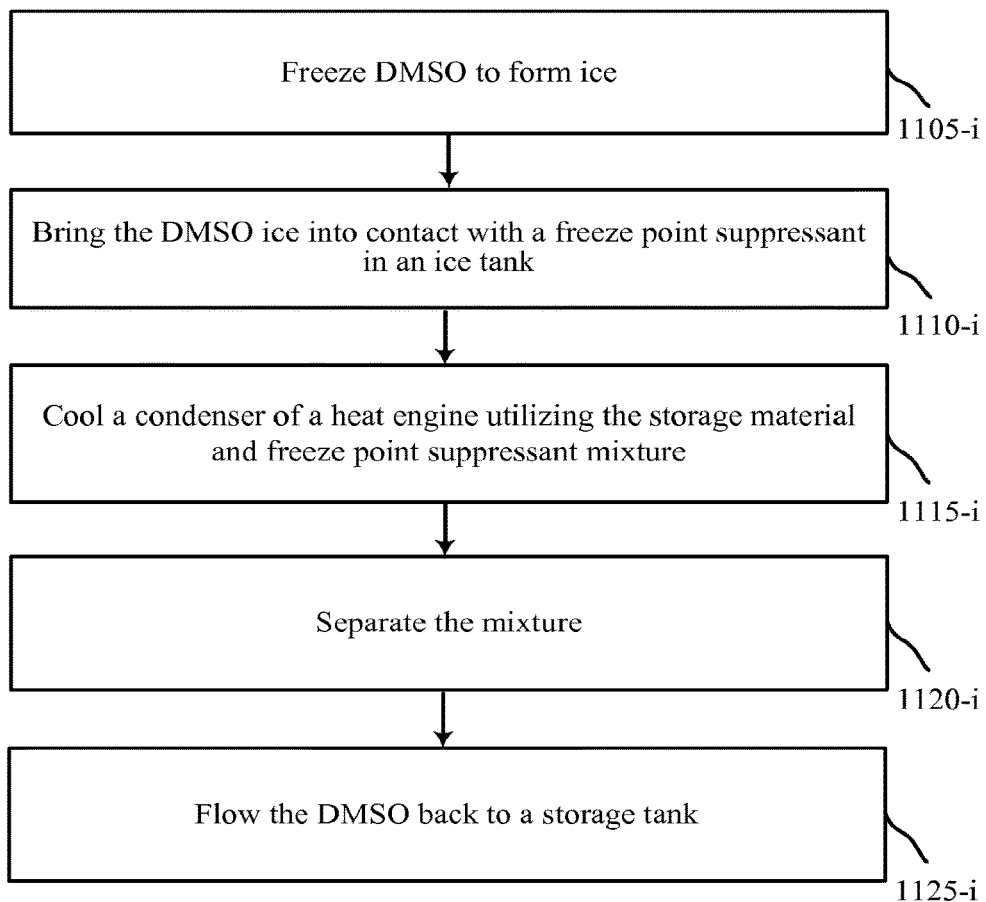
FIG. 11I shows a flow diagram of a method of thermal enhancement in accordance with various embodiments.

FIG. 11I shows a flow diagram of a method 1100-*i* of thermal enhancement in accordance with various embodiments. Method 1100-*i* may be implemented utilizing systems as those shown in FIG. 1-FIG. 10. For example, method 1100-*i* may be utilized with systems such as system 300-*a* of FIG. 3A and/or system 300-*b* of FIG. 3B. In some embodiments, method 1100-*i* provides an example of method 1100-*a*.

At block 1105-*i*, a storage material, such as DMSO, may be removed from a storage tank and frozen. The frozen DMSO may be stored for a prescribed amount of time in an insulated tank. At block 1110-*i*, the DMSO ice may be brought into contact with a freeze point suppressant in the ice tank. The freeze point of this mixture may be dictated by the properties of the mixture but may naturally approach an equilibrium temperature as the ice is entropically melted. At block 1115-*i*, the storage material and freeze point suppressant mixture may be used to cool the condenser of a heat engine through a thermal couple. At block 1120-*i*, after boosting the performance of the heat engine at block 1115-*i*, the mixture may flow back to the ice tank and then to the separator or flow directly to the separator. In this process, the freeze point suppressant and the storage material may be separated. At block 1125-*i*, the DMSO may flow to the storage tank and the concentrated freeze point suppressant may flow back to the ice tank, which may also be referred to as the mixing tank and/or combining tank.

These embodiments may not capture the full extent of combination and permutations of materials and process equipment. However, they may demonstrate the range of applicability of the method, devices, and/or systems. The different embodiments may utilize more or less stages than those described. The different embodiments may also utilize aspects of each other. In each of these embodiments, the heat engines may be replaced by fuel cells or other systems enhanced by the presence of very cold materials, for example. The boosting techniques in general may be utilized with different thermodynamic systems and/or devices. Furthermore, each embodiment can work with a large array of heat engines running of a large array of energy sources.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of stages may be undertaken before, during, or after the above elements are considered. Accordingly, the above description should not be taken as limiting the scope of the invention.

The invention claimed is:

1. A method comprising:
   forming ice with an ice harvester;
   combining the ice with a freeze point suppressant in a first tank;
   forming a first liquid in the first tank through melting the ice from combining the ice with the freeze point suppressant, wherein the first liquid includes the freeze point suppressant;
   removing heat from one or more devices utilizing the first liquid passing through a thermal couple, wherein the first liquid includes the freeze point suppressant and the first liquid formed through the combining of the ice with the freeze point suppressant to melt the ice;
   passing the first liquid through a regenerative heat exchanger after removing the heat from the one or more devices;
   separating at least a portion of the freeze point suppressant and a portion of melted ice from the first liquid utilizing a separator; and
   conveying the portion of the melted ice back to the ice harvester.

2. The method of claim 1, wherein removing the heat from the one or more devices utilizes one or more heat exchangers.

3. The method of claim 1, wherein separating at least the portion of the freeze point suppressant from the first liquid utilizes a pressure driven separation process.

4. The method of claim 1, wherein separating at least the portion of the freeze point suppressant from the first liquid utilizes a thermal driven separation process.

5. The method of claim 1, wherein separating at least the portion of the freeze point suppressant from the first liquid utilizes vapor compression distillation process.

6. The method of claim 1, wherein separating at least the portion of the freeze point suppressant from the first liquid utilizes a membrane.

7. The method of claim 6, wherein the membrane includes a reverse osmosis membrane.

8. The method of claim 6, wherein the membrane includes a nano-filtration membrane.

9. The method of claim 1, wherein separating at least the portion of the freeze point suppressant from the first liquid utilizes a distillation process.

10. The method of claim 1, wherein the one or more devices include a vapor compression cycle.

11. The method of claim 1, wherein the first liquid includes water.

12. The method of claim 1, wherein the first liquid includes an organic material.

13. The method of claim 1, wherein the freeze point suppressant includes an ionic material.

14. The method of claim 1, wherein the freeze point suppressant includes a salt.

15. The method of claim 1, wherein the freeze point suppressant includes an organic material.

16. The method of claim 1, wherein the one or more devices include at least a refrigeration device or a freezer device.

17. The method of claim 1, wherein the one or more devices include an electrical generator.

18. The method of claim 1, wherein the one or more devices include a heat engine.

* * * * *